United States Patent
Ozawa

(10) Patent No.: US 9,894,277 B2
(45) Date of Patent: Feb. 13, 2018

(54) IMAGING DEVICE, ANNOUNCING METHOD, AND RECORDING MEDIUM FOR INDICATING WHETHER OR NOT A MAIN SUBJECT IS ONLY WITHIN A FIRST AREA OF AN IMAGE

(71) Applicant: Olympus Corporation, Shibuya-ku, Tokyo (JP)

(72) Inventor: Kazuhiro Ozawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 1029 days.

(21) Appl. No.: 14/092,374

(22) Filed: Nov. 27, 2013

(65) Prior Publication Data

US 2014/0168448 A1    Jun. 19, 2014

(30) Foreign Application Priority Data

Dec. 17, 2012  (JP) ................................ 2012-275024

(51) Int. Cl.
*H04N 5/232* (2006.01)
*G06K 9/00* (2006.01)
*G06K 9/32* (2006.01)

(52) U.S. Cl.
CPC ..... *H04N 5/23254* (2013.01); *G06K 9/00369* (2013.01); *G06K 9/3216* (2013.01); *H04N 5/23216* (2013.01); *H04N 5/23219* (2013.01); *H04N 5/23245* (2013.01); *H04N 5/23293* (2013.01); *H04N 5/23296* (2013.01)

(58) Field of Classification Search
None
See application file for complete search history.

(56) References Cited

U.S. PATENT DOCUMENTS

| 6,016,407 A | 1/2000 | Tsukahara |
|---|---|---|
| 2003/0103149 A1* | 6/2003 | Kinjo ................ G06F 17/30265 348/231.5 |
| 2005/0093977 A1 | 5/2005 | Kikuchi et al. |

(Continued)

FOREIGN PATENT DOCUMENTS

| JP | 7-30795 | 1/1995 |
|---|---|---|
| JP | 11-38494 | 2/1999 |

(Continued)

OTHER PUBLICATIONS

First Notice of Rejection Ground to corresponding Chinese Patent Application No. 201310665363.2, dated Jul. 5, 2016 (6 pgs.), with partial translation (3 pgs.).

(Continued)

*Primary Examiner* — Kevin McInnish
(74) *Attorney, Agent, or Firm* — John C. Pokotylo; Pokotylo Patent Services

(57) ABSTRACT

An imaging device sets a first area and a second area other than the first area on a captured image; sets a main subject based on the captured image or another image; periodically detects the position of the main subject on the captured image; and performs control depending on a detection result so that it is indicated that the main subject exists only in the first area when the main subject does not exist in the second area, and it is indicated that the main subject does not exist only in the first area when the main subject exists in the second area.

11 Claims, 32 Drawing Sheets

(56) References Cited

U.S. PATENT DOCUMENTS

| | | | |
|---|---|---|---|
| 2005/0195285 A1* | 9/2005 | Ide | H04N 5/23296 |
| | | | 348/208.99 |
| 2009/0225184 A1 | 9/2009 | Sugino et al. | |
| 2011/0063118 A1* | 3/2011 | Sato | H04N 1/00127 |
| | | | 340/635 |
| 2012/0062769 A1 | 3/2012 | Kinoshita et al. | |
| 2012/0113267 A1* | 5/2012 | Ishige | H04N 5/145 |
| | | | 348/169 |
| 2012/0236173 A1* | 9/2012 | Telek | G03B 17/08 |
| | | | 348/223.1 |
| 2012/0268608 A1* | 10/2012 | Watanabe | H04N 5/23219 |
| | | | 348/169 |
| 2014/0139686 A1* | 5/2014 | Shih | H04N 5/232 |
| | | | 348/169 |

FOREIGN PATENT DOCUMENTS

| | | |
|---|---|---|
| JP | 2005-130462 | 5/2005 |
| JP | 2007-049362 | 2/2007 |
| JP | 2007-129480 | 5/2007 |
| JP | 2008-182374 | 8/2008 |
| JP | 2009-212713 | 9/2009 |
| JP | 2010-152135 | 7/2010 |
| JP | 2011-209620 | 10/2011 |
| JP | 2011-223265 | 11/2011 |

OTHER PUBLICATIONS

Notice of Rejection Ground from corresponding Japanese Patent Application No. 2012-275024, dated Aug. 16, 2016 (3 pgs.), with translation (4 pgs.).

\* cited by examiner

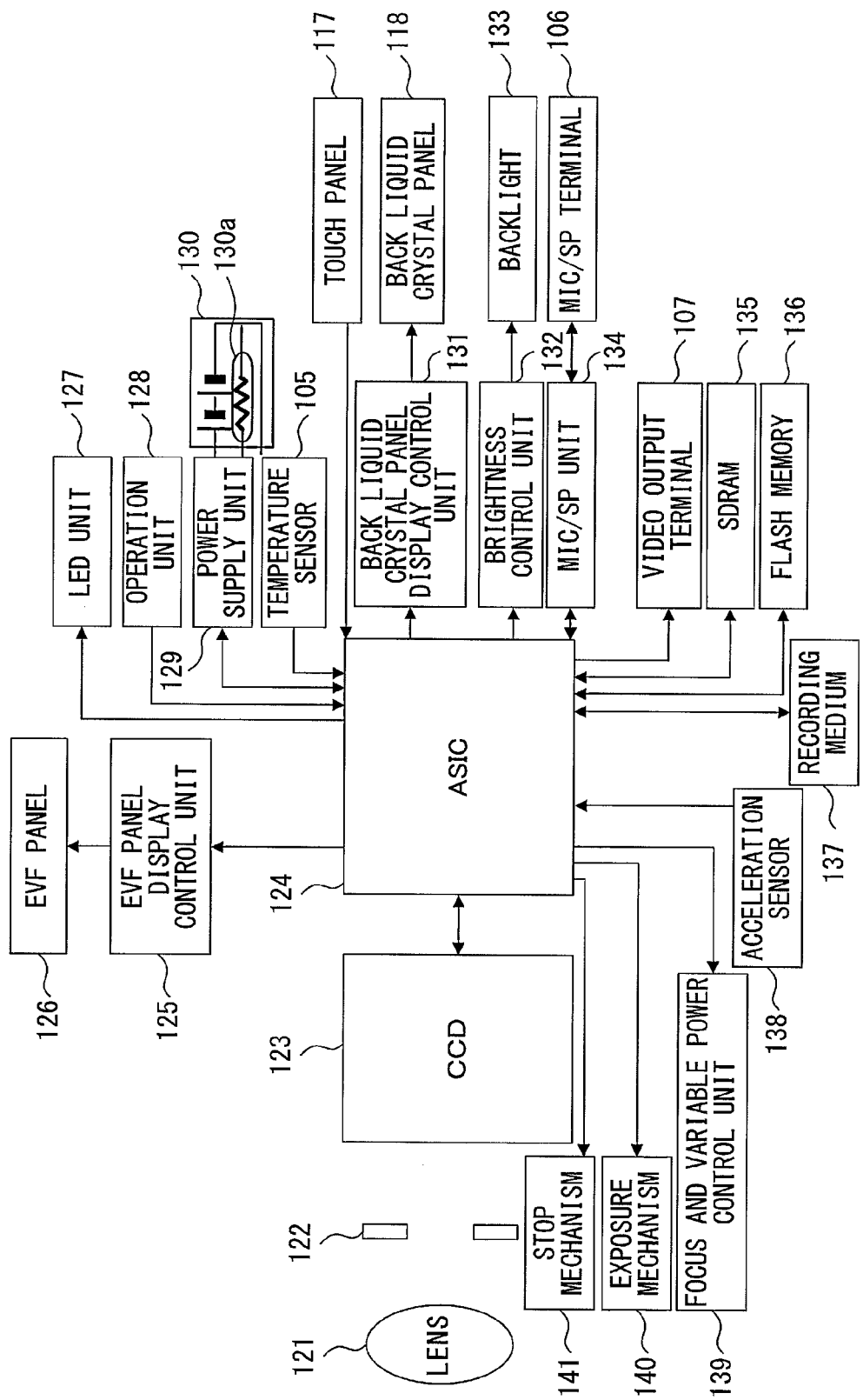
F I G. 2

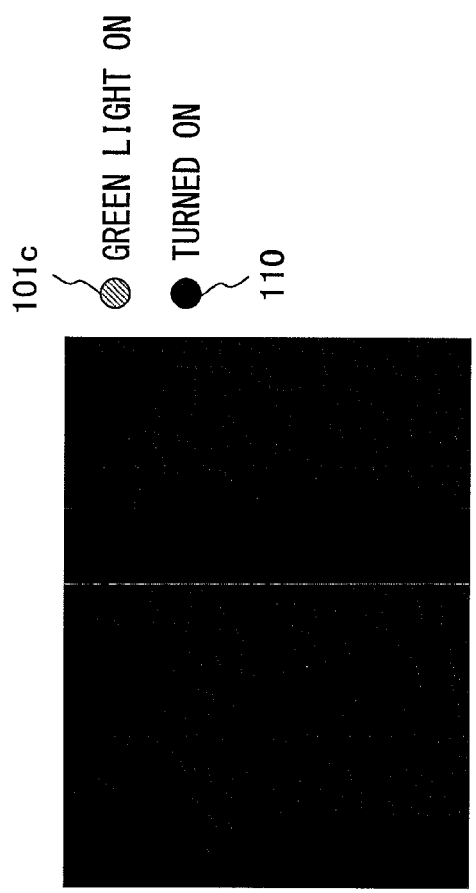
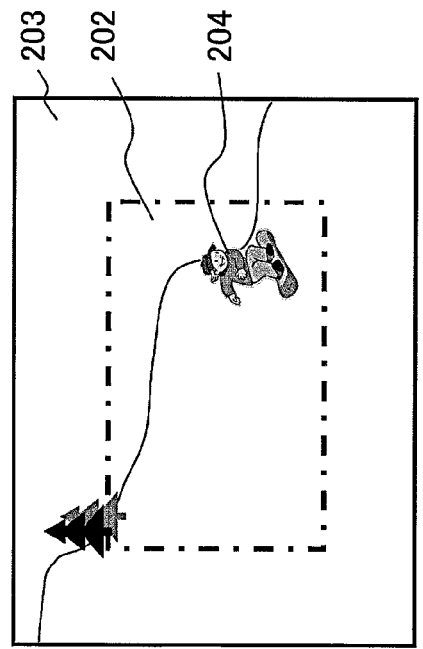
TIME t5
FIG. 5E

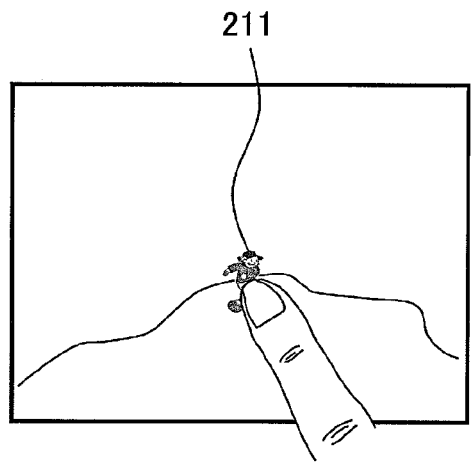
F I G. 6 A
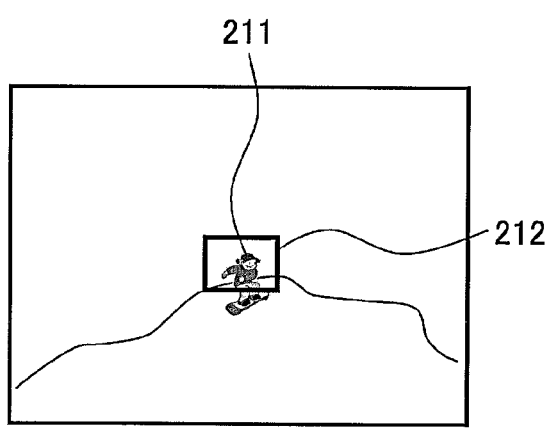
F I G. 6 B
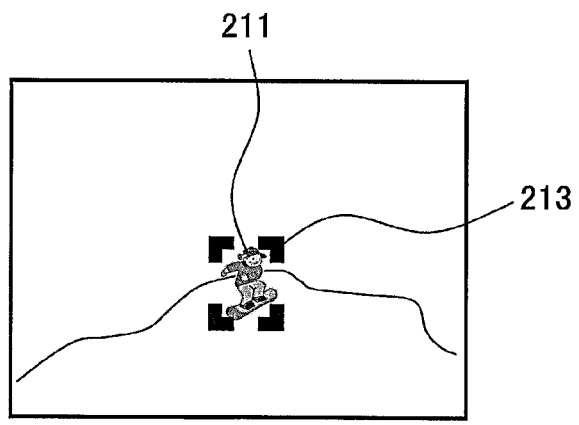
F I G. 6 C

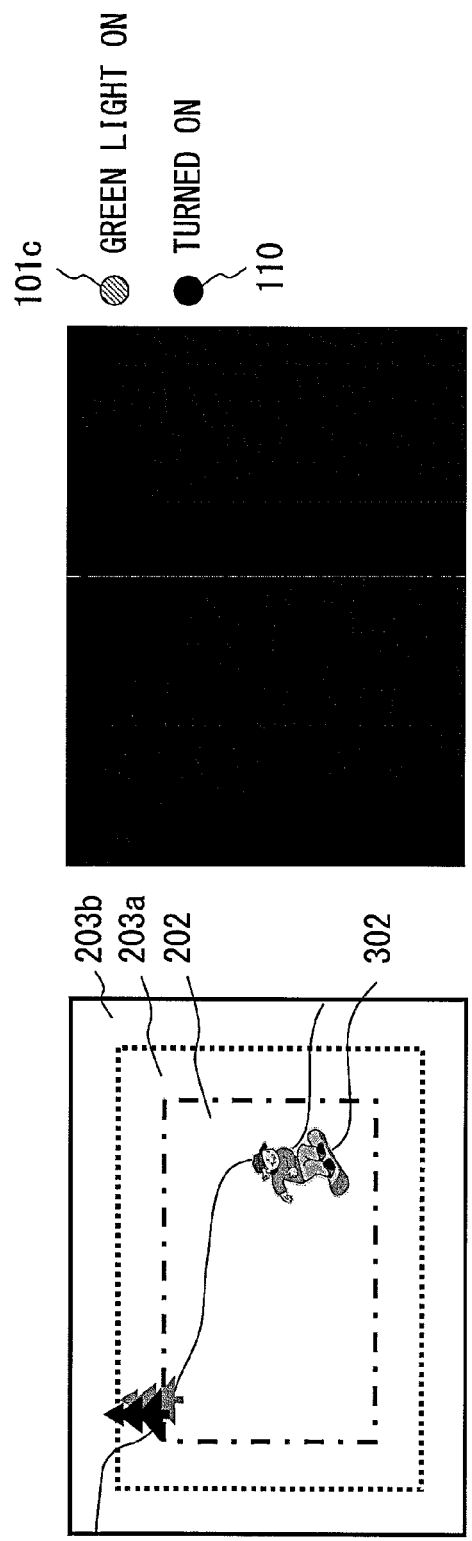

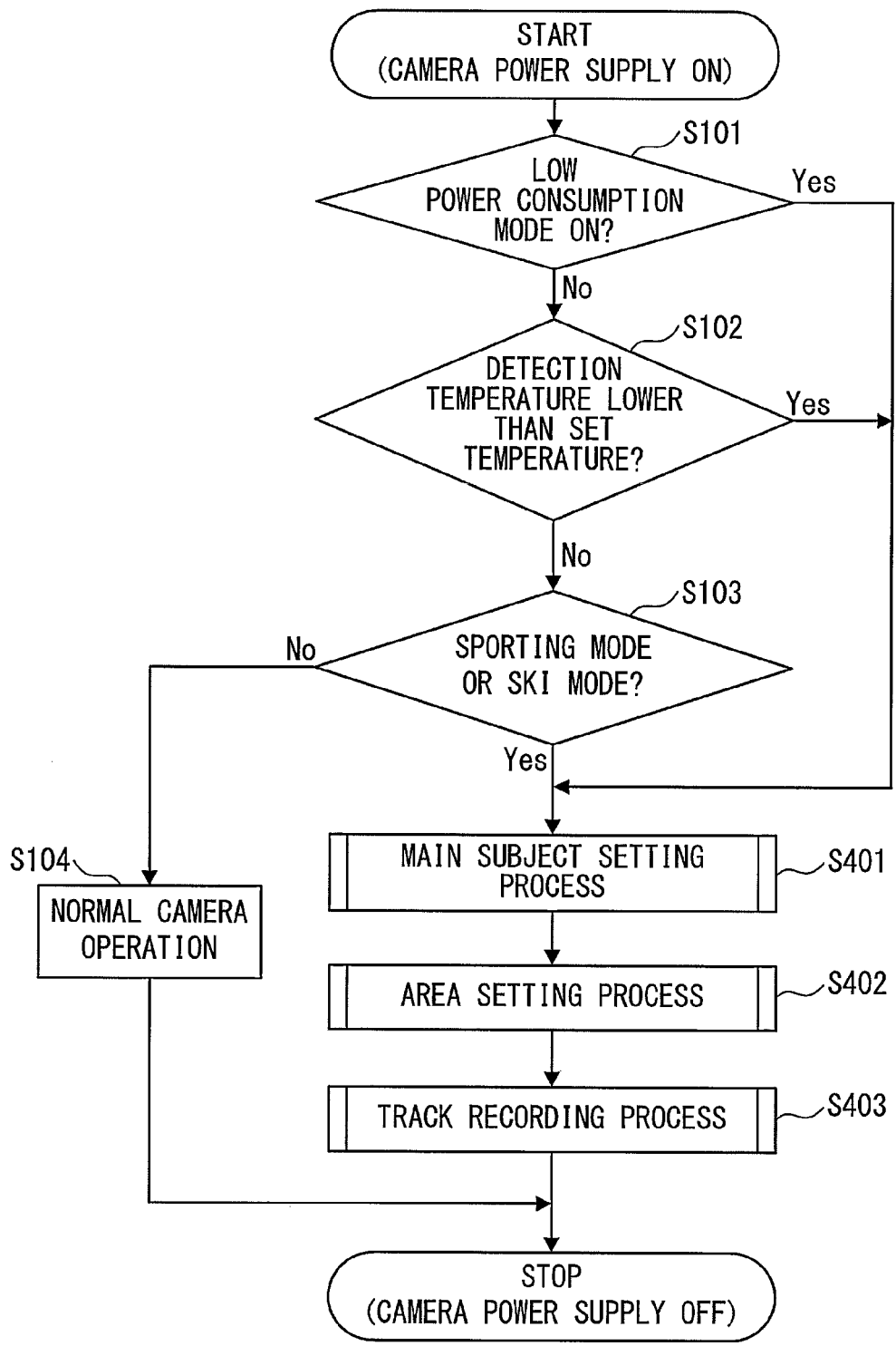
F I G. 1 2

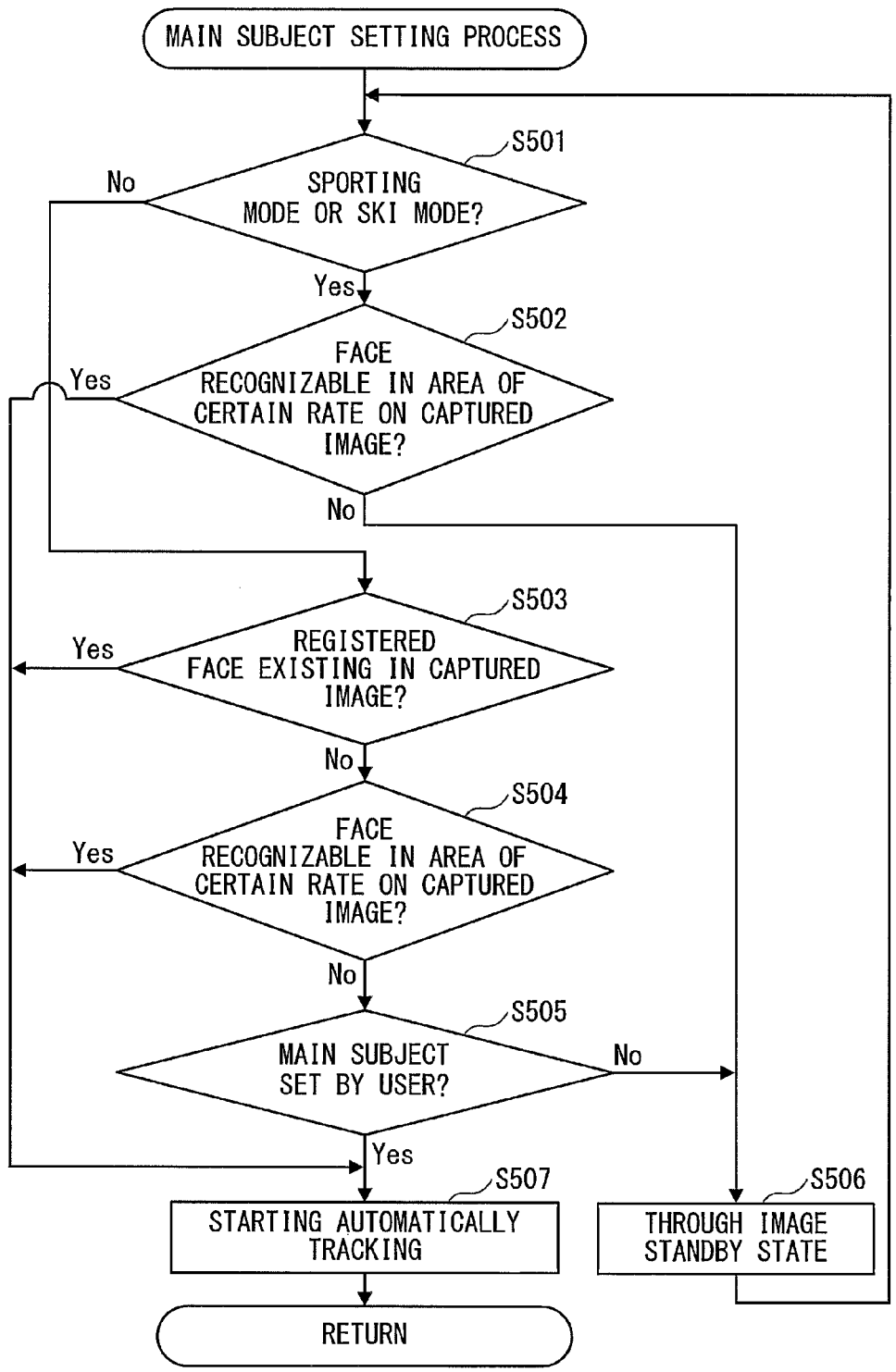
F I G. 13

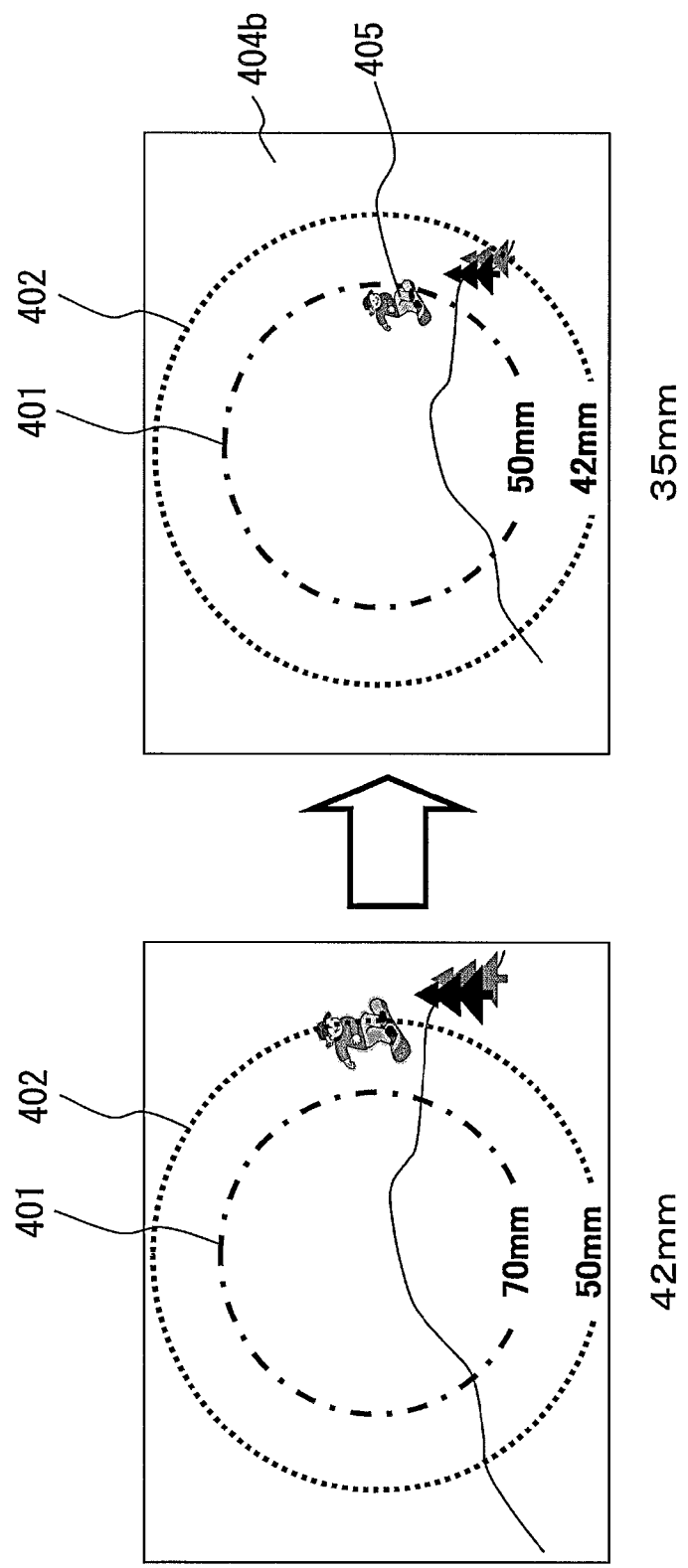
F I G. 17

IMAGING DEVICE, ANNOUNCING METHOD, AND RECORDING MEDIUM FOR INDICATING WHETHER OR NOT A MAIN SUBJECT IS ONLY WITHIN A FIRST AREA OF AN IMAGE

CROSS-REFERENCE TO RELATED APPLICATIONS

This application is based upon and claims the benefit of priority of the prior Japanese Patent Application No. 2012-275024, filed on Dec. 17, 2012, the entire contents of which are incorporated herein by reference.

FIELD

The present invention is related to an imaging device provided with the function of automatically tracking a moving subject.

BACKGROUND

Recently, low power consumption is requested for an imaging device in a digital camera etc. Especially for a battery-driven portable imaging device whose power supply is limited, the low power consumption is earnestly requested for the purpose of increasing the number of shot still images, the moving image shooting time, etc. Furthermore, in the shooting scene at a low temperature in skiing, snowboarding, etc., the number of shot images and the shooting time are smaller and shorter than at a normal temperature due to the feature of a battery at a low temperature, thereby further strongly requesting lower power consumption.

The following devices are known as imaging devices for the low power consumption.

For example, there is a camera which automatically reduces the setting of display time limit when a setting change is made from the shooting mode to the communication mode, and minimizes the power consumption of a display device during communications (for example, refer to the following patent document 1). With the camera, the display brightness of the display device is reduced or turned off under a specified condition.

On the other hand, the imaging device may be a digital camera provided with the function of automatically tracking a moving subject while moving images are taken (hereafter referred to as an "automatically tracking function"). Using the function of the automatically tracking function of the digital camera, it is possible to continuously bring a specific subject (for example, a face etc.) into focus. Thus, a user may easily shoot a moving image while continuously bringing a desired moving subject into focus.

The following device is known as an imaging device provided with an automatically tracking function.

For example, known is a safe area warning device applied to a TV camera system having an automatic AF frame tracking function of automatically tracking a desired subject with an AF area (AF frame) as a target range in which focusing is performed in an autofocus (AF) process (for example, refer to the following patent document 2). The device may appropriately attract a camera user not to allow a subject to be shot to travel outside the safe area by tracking the subject using the automatic AF frame tracking function.

Furthermore known is an imaging device which displays a guide for indicating the direction of movement of an object to be shot when the object to be shot which is being tracked travels outside the screen of the display unit (for example, refer to the following patent document 3). The device may easily return the object to be shot, which has deviated from the angle of view for shooting, back within the angle of view for shooting.

Also known is a camera system which detects the deviation of a subject when it deviates from a display screen, raises a warning operation, or captures again a subject by performing a zooming operation in the width direction, or captures the subject again by performing predicting tracking and a scanning operation (for example, refer to the following patent document 4). The system may perform an appropriate process without imposing an excess load on a user when a subject is lost.

[Patent Document 1] Japanese Laid-open Patent Publication No. 11-38494
[Patent Document 2] Japanese Laid-open Patent Publication No. 2010-152135
[Patent Document 3] Japanese Laid-open Patent Publication No. 2007-129480
[Patent Document 4] Japanese Laid-open Patent Publication No. 7-30795

SUMMARY

An imaging device according to an aspect of the present invention includes: an imaging unit which captures a subject and acquires a captured image; an area setting unit which sets a first area and a second area other than the first area on the captured image acquired by the imaging unit; a main subject setting unit which sets a main subject based on the captured image acquired by the imaging unit or another image; a subject tracking unit which periodically detects the position of the main subject on the captured image acquired by the imaging unit; an announcement unit which announces whether or not the main subject exists only in the first area; and a control unit which performs control depending on a detection result of the subject tracking unit so that the announcement unit announces that the main subject exists only in the first area when the main subject does not exist in the second area, and the announcement unit announces that the main subject does not exist only in the first area when the main subject exists in the second area.

BRIEF DESCRIPTION OF DRAWINGS

FIG. 2 is a configuration of the digital camera as the imaging device according to the first embodiment.

FIG. 5E is the fifth explanatory view of a transition example of the display in the track recording process according to the first embodiment;

FIG. 6A is the first explanatory view of a setting example of a main subject according to the first embodiment;

FIG. 6B is the second explanatory view of a setting example of a main subject according to the first embodiment;

FIG. 6C is the third explanatory view of a setting example of a main subject according to the first embodiment;

FIG. 10E is the fifth explanatory view of a transition example of the display in the track recording process according to the second embodiment;

FIG. 12 is a flowchart of an operation example of the digital camera according to a variation example of the second embodiment;

FIG. 13 is a flowchart of the details of the main subject setting process according to a variation example of the second embodiment;

FIG. 17 is an explanatory view of a display example in the track recording process according to the third embodiment;

DESCRIPTION OF EMBODIMENTS

The embodiments of the present invention are described below with reference to the attached drawings.

First Embodiment

Figure 1A:
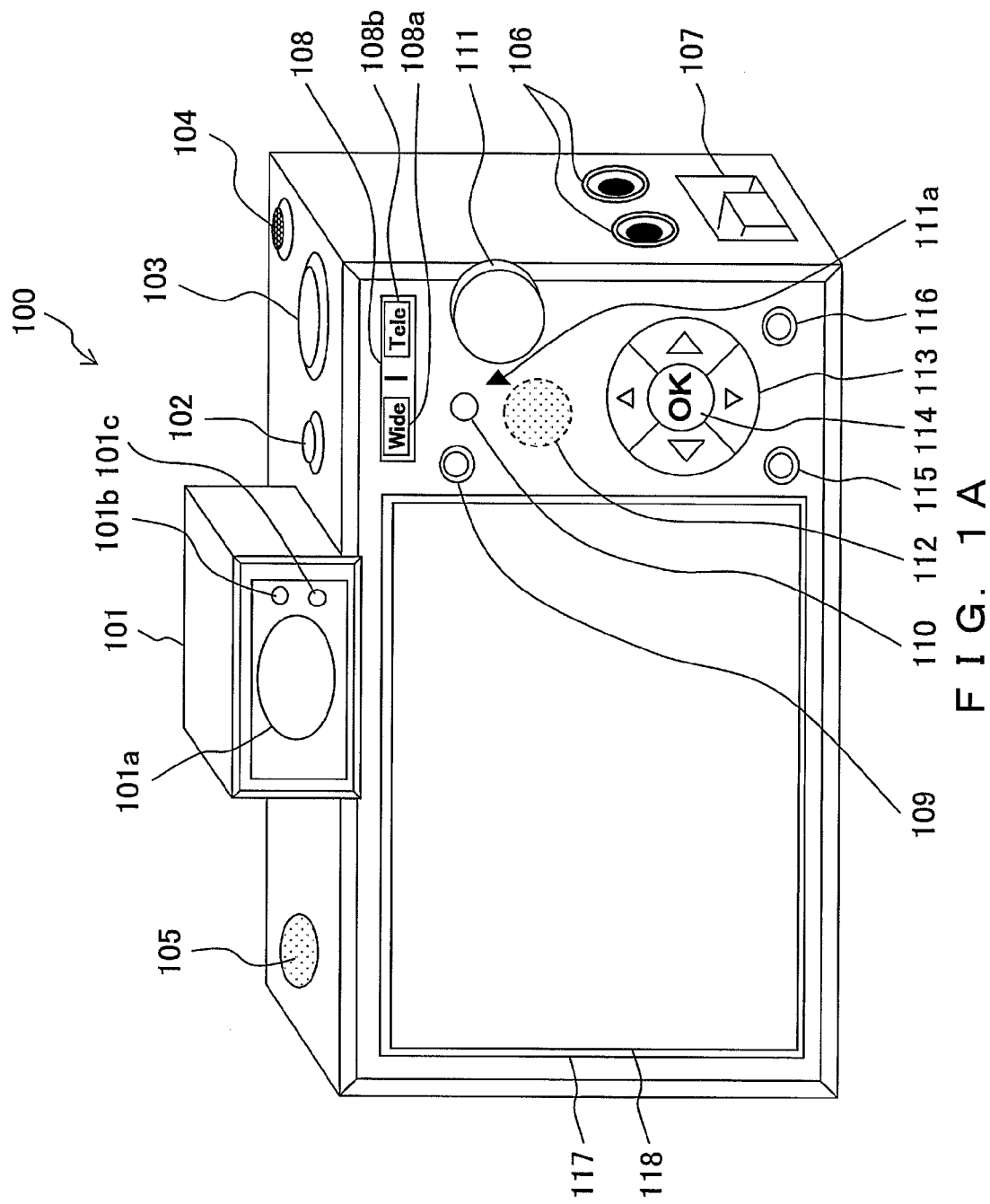
FIG. 1A is a perspective view of the back of the digital camera as the imaging device according to the first embodiment of the present invention.
Figure 1B:
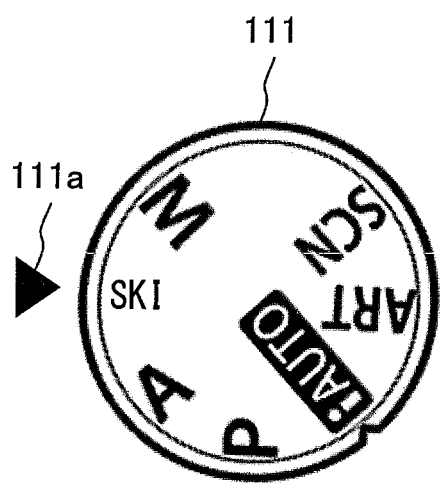
FIG. 1B is an enlarged view of a part of the digital camera illustrated in FIG. 1A.

FIG. 1A is a perspective view of the back of the digital camera as the imaging device according to the first embodiment of the present invention. FIG. 1B is an enlarged view of apart of the digital camera illustrated in FIG. 1A.

As illustrated in FIG. 1A, a digital camera 100 includes on its surface an electronic view finder (EVF) 101, a power supply button 102, a release button 103, a moving image record button 104, and a temperature sensor 105.

The EVF 101 is an external EVF which is removable from the digital camera 100, or a built-in EVF provided inside the digital camera 100, and includes a finder eyepiece part 101a, indicators 101b, and 101c. The indicator 101b is a red light emitting diode (LED). The indicator 101c is a two-color LED of red and green. As described later in details, the indicator 101b is turned on (red light on) when the track recording process is being performed and the EVF 101 is set as the destination on which display is performed. The indicator 101c turns on only the green LED (green light on), both red LED and green LED (orange light on), or only the red LED (red light on) depending on the position of the subject to be tracked on the captured image when the track recording process is being performed and the EVF 101 is set as the destination on which display is performed.

As described later in detail, the track recording process refers to the process of shooting moving images while automatically tracking a subject to be tracked. In the description below, the subject to be tracked is referred to as a main subject.

The power supply button 102 is an operation button for issuing an instruction to turn on and off the power supply of the digital camera 100. Each time the power supply button 102 is pressed, a power supply on instruction and a power supply off information are alternately issued.

The release button 103 is an operation button for issuing a recording prepare instruction (shooting prepare instruction) and a record instruction (shoot instruction) for a still image. The release button 103 is a two-step button, and issues a recording prepare instruction for a still image when it is pressed to the first step (half pressed), and issues a record instruction for a still image when it is pressed to the second step (fully pressed).

The moving image record button 104 is an operation button for issuing a recording start instruction (shooting start instruction) and a recording stop instruction (shooting stop instruction) for a moving image. Each time the moving image record button 104 is pressed, a recording start instruction and a recording stop instruction are alternately issued.

The temperature sensor 105 is an element sensor such as a thermistor etc. and detects the ambient temperature of the digital camera 100.

Furthermore, the digital camera 100 is provided with a mike-speaker terminal (hereafter referred to as a MIC/SP terminal) 106, a video output terminal 107, a universal serial bus (USB) terminal not illustrated in the attached drawings etc.

The MIC/SP terminal 106 is a terminal for connection of an external microphone and an external speaker to the digital camera 100.

The video output terminal 107 is a terminal for connection of an external display device such as a TV etc. to the digital camera 100.

The USB terminal not illustrated in the attached drawings is a communication terminal for connection of an external device such as a personal computer (PC) to the digital camera 100.

Furthermore, the digital camera 100 includes at the back a zoom button 108, a display switch button 109, an indicator 110, a mode dial 111, an index 111*a*, a speaker 112, a cross button 113, an OK button 114, a menu button 115, a delete button 116, and a back liquid crystal panel 118 with a touch panel 117.

The zoom button 108 includes a wide button 108*a* and a tele-button 108*b*. The wide button 108*a* issues an instruction to move a taking lens to the wide angle side, an instruction to switch the operation mode to a macro mode, or an instruction for scale-down by digital zoom (electronic zoom). Depending on the pressing operation of the wide button 108*a*, the taking lens is moved to the wide angle side, and if the wide button 108*a* is continuously pressed after moving the taking lens to the wide angle side (end of the wide angle), then an instruction to switch the operation mode to the macro mode is issued. If the wide button 108*a* is pressed when the scale-up by the digital zoom is specified, then the scale-down by the digital zoom is specified. The tele-button 108*b* issues an instruction to move the taking lens to the zoom-up side or an instruction for scale-up by digital zoom. Depending on the pressing operation of the tele-button 108*b*, the taking lens is moved to the zoom-up side, and if the tele-button 108*b* is continuously pressed after moving the taking lens to the maximum zoom side (end of the zoom up), then an instruction to scale up by the digital zoom is issued.

The zoom (variable power) by moving the taking lens to the wide angle side or to the zoom-up side is referred to as optical variable power. The digital zoom refers to the zoom by electronic variable power by varying the sectional area for a captured image.

The display switch button 109 issues an instruction to switch the destination on which display is performed to the EVF 101 or the back liquid crystal panel 118. Each time the display switch button 109 is pressed, an instruction to switch the destination on which display is performed to the EVF 101 and an instruction to switch the destination on which display is performed to the back liquid crystal panel 118 are alternately issued.

The indicator 110 is a red LED. As described later in detail, the indicator 110 is turned on (red light on) or blinks (red light blink) depending on the position of the main subject during the track recording process and when the destination on which an image is displayed is the back liquid crystal panel 118.

The mode dial 111 issues an instruction to switch the operation mode. In the present embodiment, as illustrated in FIG. 1B, the operation mode is switched to any of the manual mode (M), the ski mode (SKI), the stop priority mode (A), the program mode (P), the auto mode (iAUTO), the art mode (ART), and the scene mode (SCN) depending on the rotation position of the mode dial 111 for an index 111*a*. FIG. 1B illustrates the state in which the operation mode has been switched into the ski mode. The ski mode is an operation mode suitable for a shooting scene such as skiing, snowboarding, etc. When the operation mode is switched into the scene mode by the mode dial 111, the operation mode is switch into the mode as a scene mode set in advance by a user. The operation mode which may be set as a scene mode is, for example, a sporting mode applicable as a shooting scene for sports, a night view mode applicable as a shooting scene for night view, etc. A setting of a scene mode may be made on, for example, the menu screen described later.

The speaker 112 is a means for giving a sound. For example, as described later in detail, the speaker 112 gives a warning sound depending on the position of the main subject on the captured image in the track recording process. The warning sound is the beep continuously or intermittently given such as peep, pip, etc. at a frequency of about 2 kHz. However, when the warning sound is given, the warning sound itself is recorded, and may give an unnatural impression to a user when images are played back. Therefore, in the present embodiment, the warning sound and the sound having an inverse phase to the warning sound are synthesized in an internal process etc., thereby preventing the warning sound from reaching the user during the playback. Another means may be used as a means for giving the warning sound. For example, a vibration means may be provided as a means for giving a warning sound so that the vibration made by the vibration means may emit a warning sound. However, in this case, it is necessary to cut off the warning sound by the high pass filter (HPF) of an built-in microphone not illustrated in the attached drawings but provided for the digital camera 100 by reducing the frequency of the vibration (for example, down to approximately 100 Hz) etc.

The cross button 113 issues an instruction to select a selection target (for example, a menu item etc.) displayed on the back liquid crystal panel 118 by operating the button in four directions, that is up, down, left, and right.

The OK button 114 is an operation button for issuing an instruction to confirm the selection target selected by the cross button 113.

The menu button 115 is an operation button for issuing an instruction to display a menu screen on the back liquid crystal panel 118. The menu button 115 is also an operation button for issuing an instruction to release the confirm instruction by the OK button 114 during the display of the menu screen.

The delete button 116 is an operation button for issuing an instruction to delete one or more captured images selected and confirmed by the cross button 113 and the OK button 114 from among the captured images recorded on the recording medium.

The touch panel 117 is arranged as superposed on the back liquid crystal panel 118, and detects the touching operation of a user on the back liquid crystal panel 118.

The back liquid crystal panel 118 displays an image, a menu screen, etc.

FIG. 2 is a configuration example of the digital camera 100.

As illustrated in FIG. 2, the digital camera 100 includes a taking lens 121, a lens shutter 122, a charge coupled device (CCD) 123, an application specific integrated circuit (ASIC) 124, an EVF panel display control unit 125, an EVF panel 126, an LED unit 127, an operation unit 128, a power supply unit 129, a battery 130, the temperature sensor 105, the touch panel 117, a back liquid crystal panel display control unit 131, the back liquid crystal panel 118, a brightness control unit 132, a backlight 133, a mike/speaker unit (MIC/SP unit) 134, the MIC/SP terminal 106, the video output terminal 107, a synchronous dynamic random access memory (SDRAM) 135, a FLASH memory 136, a recording medium 137, an acceleration sensor 138, a focus and variable power control unit 139, an exposure mechanism 140, and a stop mechanism 141.

The taking lenses 121 are a lens group for forming a subject on the photo-reception surface of the CCD 123, and includes a focus lens (focus adjusting lens) and a zoom lens (variable power lens). The zoom lens is an example of a variable power unit.

The lens shutter 122 adjusts the exposure by opening and closing a plurality of wings, and also functions as a stop for limiting the quantity of light for a subject image formed on the photo-reception surface of the CCD 123.

The CCD 123 converts the subject image formed on the photo-reception surface into an analog electric signal, and performs processing of correlated double sampling (CDS), automatic gain control (AGC), etc. The CCD 123 is an example of an imaging unit, and may use another type of imaging unit such as a complementary metal oxide semiconductor (CMOS) etc.

As described later with reference to FIG. 3, the ASIC 124 performs various types of processing such as image processing, an input/output (I/O) process, a process of controlling each unit, etc.

The EVF panel display control unit 125 controls the display of the EVF panel 126 based on the control signal and display data (for example, image data) output by the ASIC 124.

The EVF panel 126 is, for example, a liquid crystal panel, and performs the display (for example, the display of images) depending on the display data under the control of the EVF panel display control unit 125. The EVF panel 126 is an example of the display unit. Furthermore, the EVF panel 126 turns on, reduces the brightness of, or turns off the built-in backlight not illustrated in the attached drawings. Thus, the brightness of the display of the EVF panel 126 is changed. When the brightness of the built-in backlight is reduced, the display of the EVF panel 126 is darker as compared with the built-in backlight which is turned on. The (built-in backlight of the) EVF panel 126 is an example of the announcement unit.

The LED unit 127 includes the indicators 101b, 101c, and 110, and controls the emission of the corresponding LED based on the control signal output by the ASIC 124.

The operation unit 128 includes a plurality of operation members including the power supply button 102, the release button 103, the moving image record button 104, the zoom button 108 (wide button 108a, tele-button 108b), the display switch button 109, the mode dial 111, the cross button 113, the OK button 114, the menu button 115, and the delete button 116, detects the operation states of these operation members, and outputs the detection result to the ASIC 124.

The power supply unit 129 manages the power supply. For example, the power supply unit 129 detects the remainder of the battery 130, and outputs the detection result to the ASIC 124. Furthermore, for example, the power supply unit 129 outputs a detection result of a temperature sensor 130a provided for the battery 130 to the ASIC 124.

The battery 130 is a primary or secondary battery. The battery 130 includes, for example, the temperature sensor 130a such as a thermistor etc. The temperature sensor 130a is used in detecting the temperature or the ambience temperature of the battery 130, but may also be used in detecting the ambience temperature of the digital camera 100.

The temperature sensor 105 detects the ambience temperature of the digital camera 100, and outputs the detection result to the ASIC 124.

The temperature sensor 105 and the temperature sensor 130a are examples of a temperature detector.

The touch panel 117 detects the touching operation of a user on the back liquid crystal panel 118, and outputs the detection result to the ASIC 124.

The back liquid crystal panel display control unit 131 controls the display of the back liquid crystal panel 118 based on the control signal and the display data (for example, image data) output by the ASIC 124.

The back liquid crystal panel 118 performs display (for example, displays an image) depending on the display data under the control of the back liquid crystal panel display control unit 131. The back liquid crystal panel 118 is an example of a display unit.

The brightness control unit 132 controls the brightness of the backlight 133 of the back liquid crystal panel 118 based on the control signal output by the ASIC 124.

The backlight 133 is turned on, reduced in brightness, or turned off under the control of the brightness control unit 132. When the brightness of the brightness control unit 132 is reduced, the display of the back liquid crystal panel 118 is darker than the brightness of the backlight 133 when it is turned on. The (backlight 133 of the) back liquid crystal panel 118 is an example of the announcement unit.

The MIC/SP unit 134 includes the speaker 112 and a built-in microphone not illustrated in the attached drawings. In addition, the MIC/SP unit 134 is connected to the MIC/SP terminal 106. The MIC/SP unit 134 outputs the audio signal output by the ASIC 124 to the speaker 112. Thus, sound is given from the speaker 112 depending on the audio signal. However, when an external speaker is connected to the MIC/SP terminal 106, the external speaker is prioritized over the speaker 112, and the audio signal output by the ASIC 124 is output to the external speaker. Thus, the sound depending on the audio signal is given from the external speaker. Furthermore, the MIC/SP unit 134 outputs the audio signal detected from the built-in microphone to the ASIC 124. However, when the external microphone is connected to the MIC/SP terminal 106, the external microphone is prioritized over the built-in microphone, and the audio signal detected from the external microphone is output to the ASIC 124.

The video output terminal 107 is a terminal for connection of an external display device to the digital camera 100. When the external display device is connected to the terminal, the video signal output by the ASIC 124 is output to the external display device through the terminal.

The SDRAM 135 is memory for temporarily storing data to be processed in the ASIC 124. For example, the image data output by the A/D converter in the ASIC 124 as described later, the detected data, the data being processed by the image processing unit described later in the ASIC 124, etc. are temporarily stored.

The FLASH memory 136 stores a program executed by the CPU in the ASIC 124 as described later (including an announcement program), the data used during the execution of the program, etc.

The recording medium 137 is a memory card etc. which is freely attached to and detached from the digital camera 100, and stores a captured image. The recording medium 137 is not limited to what is freely attached and detached, but may be non-volatile memory built in the digital camera 100, a hard disk, etc.

The acceleration sensor 138 detects the acceleration in the direction of pan, the direction of tilt, and the direction of yaw of the digital camera 100, and outputs the detection result to the ASIC 124.

The focus and variable power control unit 139 controls the drive of the taking lens 121 (focus lens, zoom lens) according to the control signal output from the ASIC 124. Thus, the focus and the variable power are controlled.

The exposure mechanism 140 controls the drive of the lens shutter 122 according to the control signal relating to the exposure which is output by the ASIC 124, thereby controlling the exposure.

The stop mechanism 141 controls the drive of the lens shutter 122 according to the control signal relating to the stop which is output by the ASIC 124, thereby controlling the stop.

Figure 3:
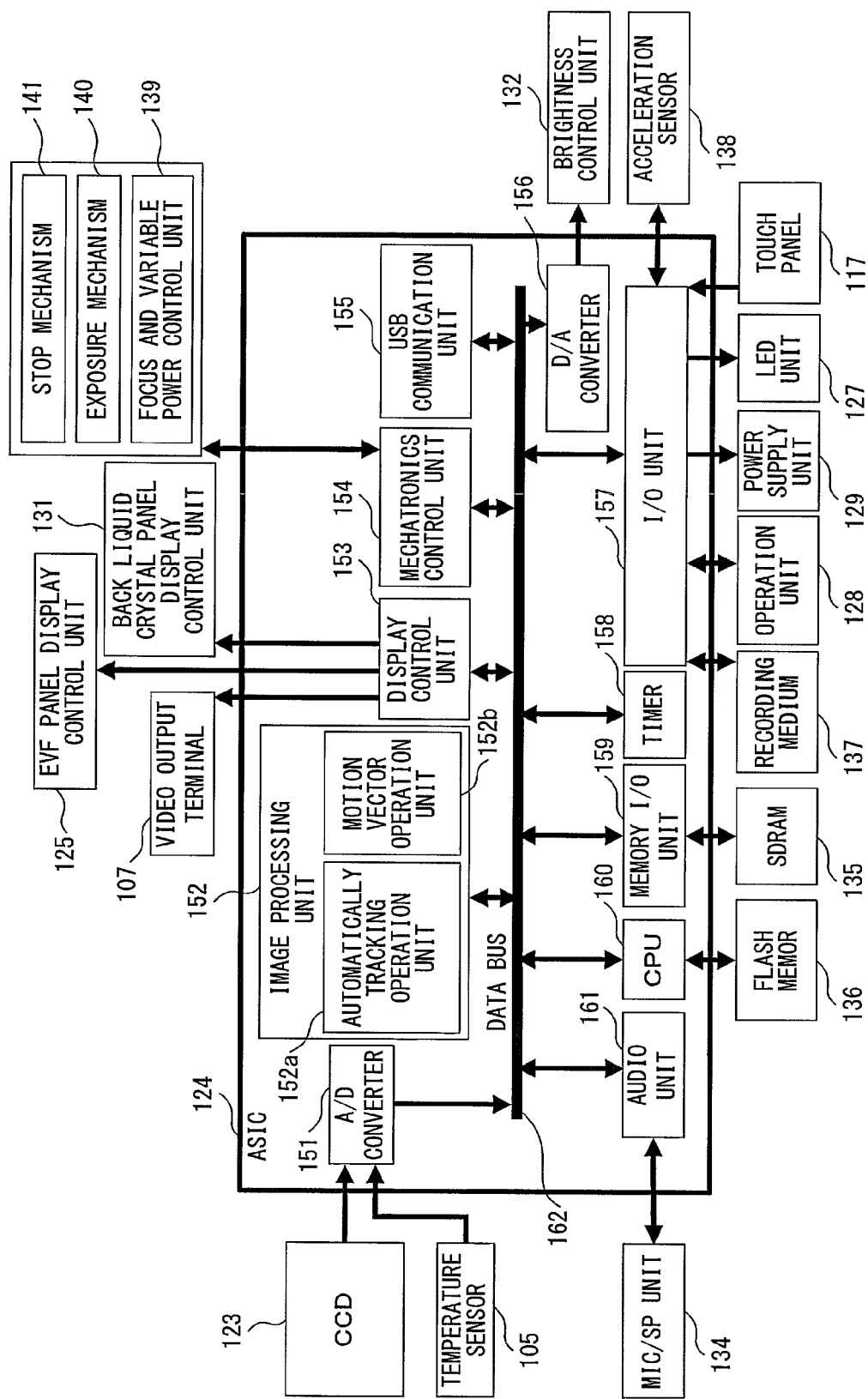
FIG. 3 is an example of the configuration of the system of an ASIC.

FIG. 3 is a configuration example of the system of the ASIC 124.

As illustrated in FIG. 3, the ASIC 124 includes an A/D converter 151, an image processing unit 152, a display control unit 153, a mechatronics control unit 154, a USB communication unit 155, a D/A converter 156, an I/O unit 157, a timer 158, a memory I/O unit 159, a CPU 160, an audio unit 161, and a data bus 162 to which each of the units above is connected, and is configured so that each unit may transmit and receive data to and from each other.

The A/D converter 151 converts the image data (of a captured image) as an analog electric signal output from the CCD 123 into image data as a digital electric signal. In addition, the A/D converter 151 converts the detected data (the detection result of the temperature sensor 105) as an analog electric signal output from the temperature sensor 105 into detected data as a digital electric signal. The image data as a digital electric signal output by the A/D converter 151, and the detected data as a digital electric signal output by the A/D converter 151 are temporarily stored in the SDRAM 135 through the memory I/O unit 159.

The image processing unit 152 performs various types of image processing. For example, the image processing unit 152 generates the image data of an image displayed on the EVF panel 126 using the image data output by the A/D converter 151 and temporarily stored in the SDRAM 135. Furthermore, for example, it generates the image data of an image displayed on the back liquid crystal panel 118 using the image data output by the A/D converter 151 and temporarily stored in the SDRAM 135. Additionally, for example, it generates the image data for a video signal using the image data output by the A/D converter 151 and temporarily stored in the SDRAM 135. Furthermore, for example, it segments image data from a captured image in the digital zoom using the image data output by the A/D converter 151 and temporarily stored in the SDRAM 135. The image processing unit 152 is an example of a variable power unit.

Furthermore, the image processing unit 152 includes an automatically tracking operation unit 152*a* and a motion vector operation unit 152*b*. The automatically tracking operation unit 152*a* performs an operation for periodically detecting the position of the main subject on the image (captured image) relating to the image data output by the A/D converter 151 and temporarily stored in the SDRAM 135. The automatically tracking operation unit 152*a* is an example of a subject tracking unit. The motion vector operation unit 152*b* performs an operation for obtaining a motion vector of a main subject using the position of the main subject periodically detected by the operation performed by the automatically tracking operation unit 152*a*.

The display control unit 153 performs a display control process depending on the destination on which display is performed. For example, when the destination on which display is performed is the EVF panel 126, the corresponding control signal and display data are output to the EVF panel display control unit 125. The display data is, for example, the above-mentioned image data of the image displayed on the EVF panel 126 generated by the image processing unit 152. Furthermore, for example, when the destination on which display is performed is the back liquid crystal panel 118, the corresponding control signal and display data are output to the back liquid crystal panel display control unit 131. The display data is, for example, the above-mentioned image data of the image displayed on the back liquid crystal panel 118 generated by the image processing unit 152. Furthermore, for example, when the destination on which display is performed is an external display device (connected to the video output terminal 107) such as a TV etc., the display data is converted into a video signal, and output to the video output terminal 107. The display data is, for example, the above-mentioned image data for a video signal generated by the image processing unit 152.

The mechatronics control unit 154 performs a mechatronics control process such as driving the taking lens 121 (focus lens, zoom lens), driving the lens shutter 122, etc. For example, to control the drive of the taking lens 121 (focus lens, zoom lens), the mechatronics control unit 154 outputs a control signal to the focus and variable power control unit 139. Furthermore, for example, to control the drive of the lens shutter 122 for exposure, the mechatronics control unit 154 outputs a control signal to the exposure mechanism 140. Also for example, to control the drive of the lens shutter 122 for a stop, the mechatronics control unit 154 outputs a control signal to the stop mechanism 141.

The USB communication unit 155 communicates with an external device (for example, a PC) connected to a USB terminal not illustrated in the attached drawings through a USB cable.

The D/A converter 156 converts a control signal as a digital signal for control of the brightness of the backlight 133 into a control signal as an analog signal, and outputs the resultant signal to the brightness control unit 132.

The I/O unit 157 controls the input and output of data to and from the acceleration sensor 138, the touch panel 117, the LED unit 127, the power supply unit 129, the operation unit 128, and the recording medium 137.

The timer 158 measures time.

The memory I/O unit 159 controls the input and output of the data to and from the SDRAM 135

The CPU 160 controls the entire operation of the digital camera 100 by reading and executing the program stored in the FLASH memory 136. For example, as described later in detail, the CPU 160 performs the process of setting the first area and the second area on a captured image, the process of setting a main subject, the process for control of an announcement as to whether or not there is a main subject in the first area, the process of setting a low power consumption mode, the process of obtaining the amount of position change per unit time of a main subject, etc. The CPU 160 is an example of an area setting unit, a main subject setting unit, a control unit, an operation mode setting unit, and a speed detection unit.

The audio unit 161 includes the A/D converter and the D/A converter not illustrated in the attached drawings, converts an audio signal (for example, an audio signal of a warning sound) as a digital signal into an audio signal as an analog signal, and outputs the resultant signal to the MIC/SP unit 134. Furthermore, the audio unit 161 converts, for example, an audio signal as an analog signal input from the MIC/SP unit 134 into an audio signal as a digital signal.

The digital camera 100 is also an imaging device including a computer because it includes function elements of control, operation, storage, input, and output as described above.

Next, the operation of the digital camera 100 as an imaging device according to the present embodiment is described below with reference to FIGS. 4 through 8. The description is mainly related to the operation of the track recording process and the associated operation as an example of the operation of the digital camera 100. First, the outline of the operation is described with reference to FIGS. 4 through 6, and the flowchart of the operation is described with reference to FIGS. 7 and 8.

Figure 4:
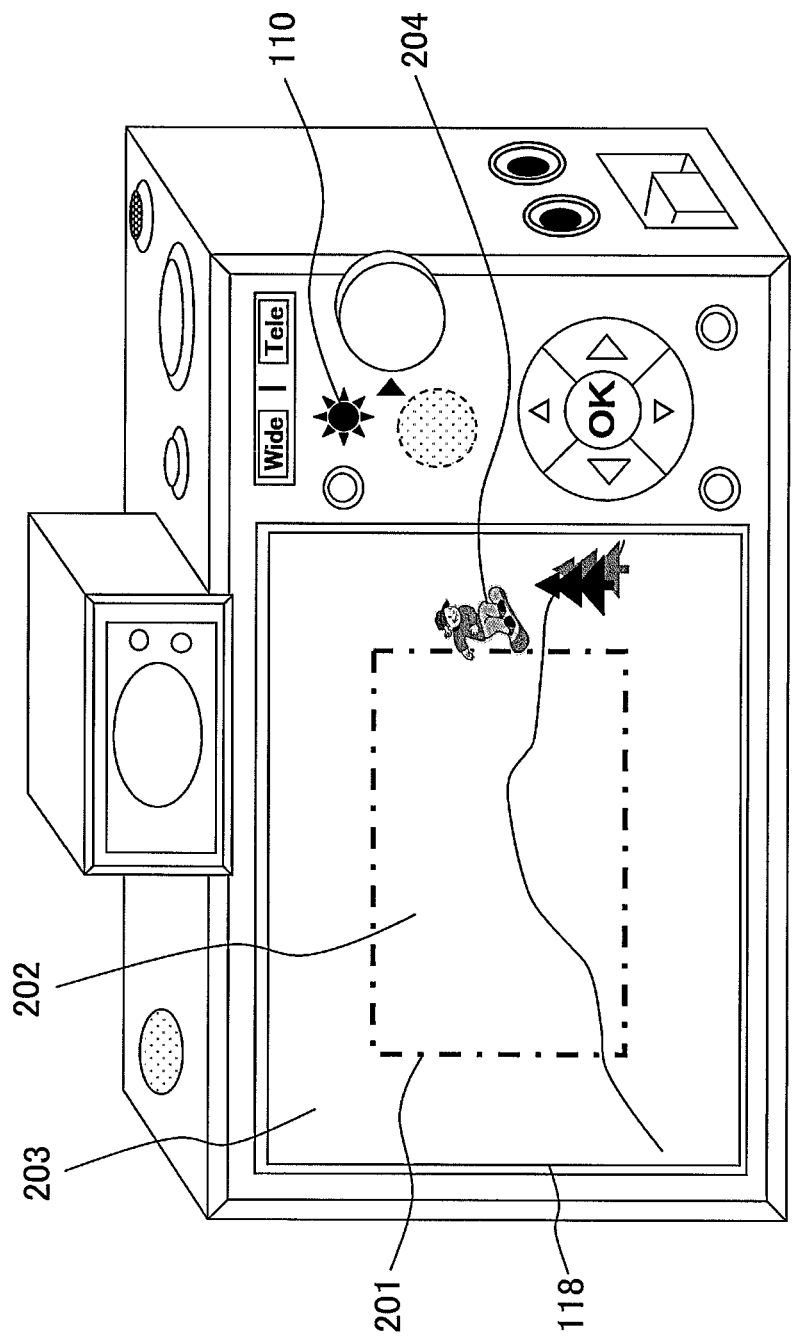
FIG. 4 is an explanatory view of a display example in the track recording process according to the first embodiment.

FIG. 4 is an explanatory view of a display example in the track recording process.

FIG. 4 illustrates an example of the case in which the destination on which display is performed is the back liquid crystal panel 118, which is similar to the case in which the destination on which display is performed is the EVF panel 126.

In the track recording process, a rectangular frame 201 by alternate long and short dashed line is superposed and displayed with a captured image obtained by shooting moving images. The frame 201 indicates the boundary between a first area 202 and a second area 203 set in advance on the captured image. The first area 202 is an area on the captured image including the center of the captured image, and the second area 203 is an area other than the first area 202 on the captured image.

Then, as illustrated in FIG. 4, when a subject 204 set in advance as a main subject exists in the second area 203, (the backlight 133 of) the back liquid crystal panel 118 is turned on, the indicator 110 is blinked, and a warning sound is generated by the speaker 112 as an announcement that the main subject 204 does not exist only in the first area 202. The case in which the main subject 204 exists in the second area 203 refers to the case in which all or a part of the area recognized as the main subject 204 exists in the second area 203. Furthermore, the announcement that the main subject 204 does not exist only in the first area 202 is also the announcement that there is the possibility that the main subject 204 runs out of the captured image.

On the other hand, although not illustrated in FIG. 4, when the main subject 204 does not exist in the second area 203, the (backlight 133 of the) back liquid crystal panel 118 is turned off, and the indicator 110 is turned on as an announcement that the main subject 204 exists only in the first area 202. The announcement that the main subject 204 exists only in the first area 202 is also an announcement that there is not the possibility that the main subject 204 runs out of the captured image.

FIG. 5 (FIGS. 5A, 5B, 5C, 5D, and 5E) is an explanatory view of a transition example of the display in the track recording process.

FIGS. 5A, 5B, 5C, 5D, and 5E respectively indicate the display state at time t1, t2, t3, t4, and t5. Assume that the time passes from time t1 to time t5. In each of FIGS. 5A, 5B, 5C, 5D, and 5E, the left image indicates the display of the back liquid crystal panel 118 when the backlight 133 is ignored, or the display of the EVF panel 126 when the built-in backlight is ignored. Also in each of FIGS. 5A, 5B, 5C, 5D, and 5E, the right image indicates the display of the actual back liquid crystal panel 118, or the display of the EVF panel 126. The indicator 101c and the indicator 110 in each of FIGS. 5A, 5B, 5C, 5D, and 5E respectively indicate the state of the indicator 101c when the destination on which display is performed is the EVF panel 126, and the state of the indicator 110 when the destination on which display is performed is the back liquid crystal panel 118.

Figure 5A:
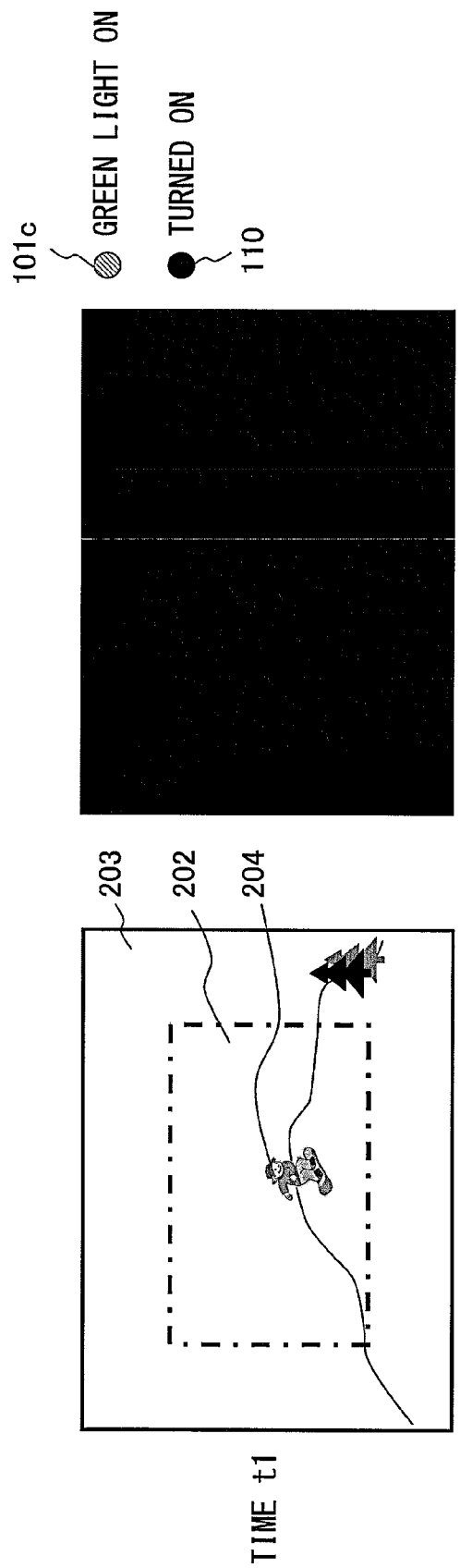
FIG. 5A is the first explanatory view of a transition example of the display in the track recording process according to the first embodiment.

At time t1, since the main subject 204 does not exist in the second area 203 as indicated in FIG. 5A, the announcement that the main subject 204 exists only in the first area 202 is issued. That is, when the destination on which display is performed is the back liquid crystal panel 118, the (backlight 133 of the) back liquid crystal panel 118 is turned off, and the indicator 110 is turned on as the announcement. Otherwise, when the destination on which display is performed is the EVF panel 126, the (built-in backlight of the) EVF panel 126 is turned off, and the indicator 101c is turned on (green light on) as the announcement.

Figure 5B:
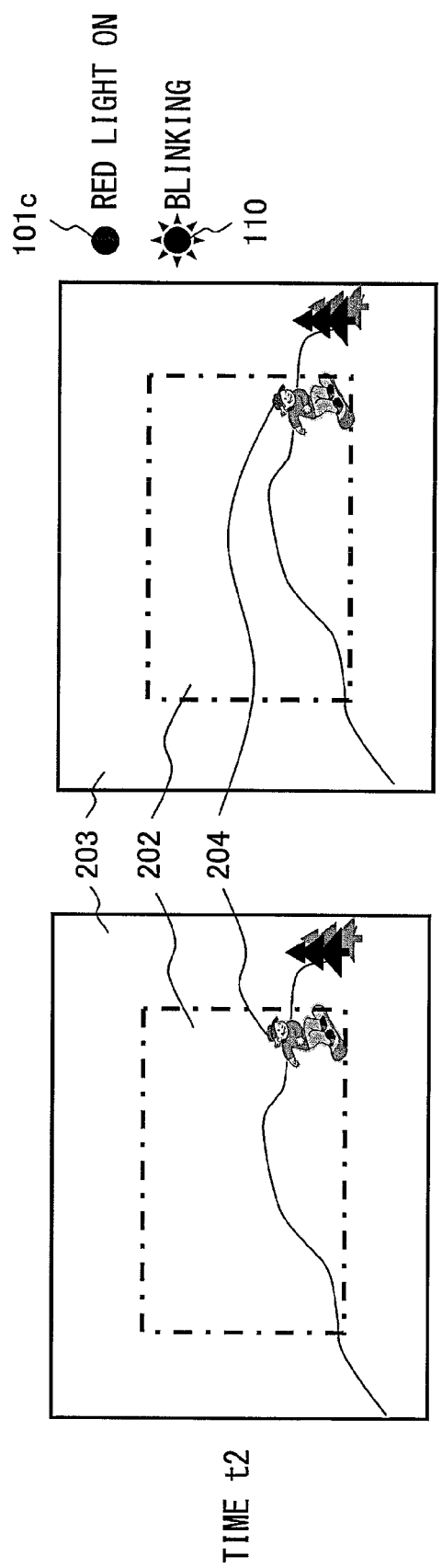
FIG. 5B is the second explanatory view of a transition example of the display in the track recording process according to the first embodiment.

At time t2 after time t1, since the main subject 204 exists in the second area 203 as indicated in FIG. 5B, the announcement that the main subject 204 does not exist only in the first area 202 is issued. That is, when the destination on which display is performed is the back liquid crystal panel 118, the (backlight 133 of the) back liquid crystal panel 118 is turned on, the indicator 110 is blinked, and a warning sound is generated by the speaker 112 as the announcement. Otherwise, when the destination on which display is performed is the EVF panel 126, the (built-in backlight of the) EVF panel 126 is turned on, the indicator 101c is turned on (red light on), and a warning sound is generated by the speaker 112 as the announcement.

Figure 5C:
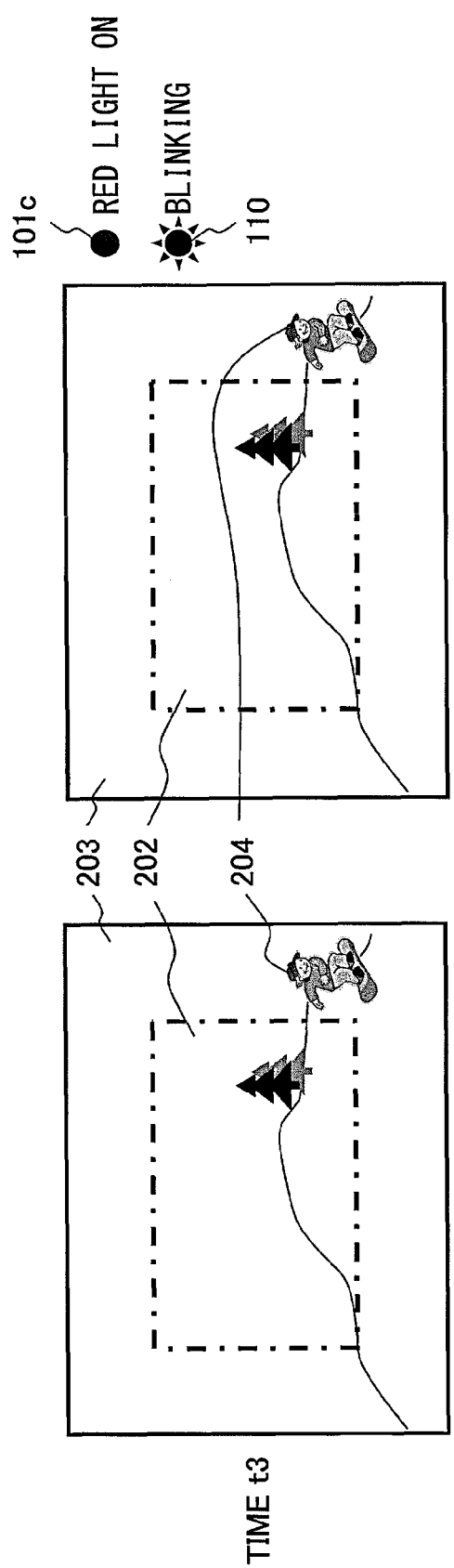
FIG. 5C is the third explanatory view of a transition example of the display in the track recording process according to the first embodiment.

At time t3 after time t2, since the main subject 204 still exists in the second area 203 as indicated in FIG. 5C, the announcement that the main subject 204 does not exist only in the first area 202 is issued as in FIG. 5B.

Assume that a user starts panning the digital camera 100 from the direction of shooting to the right according to the announcement so that the main subject 204 does not run out of the captured image.

Figure 5D:
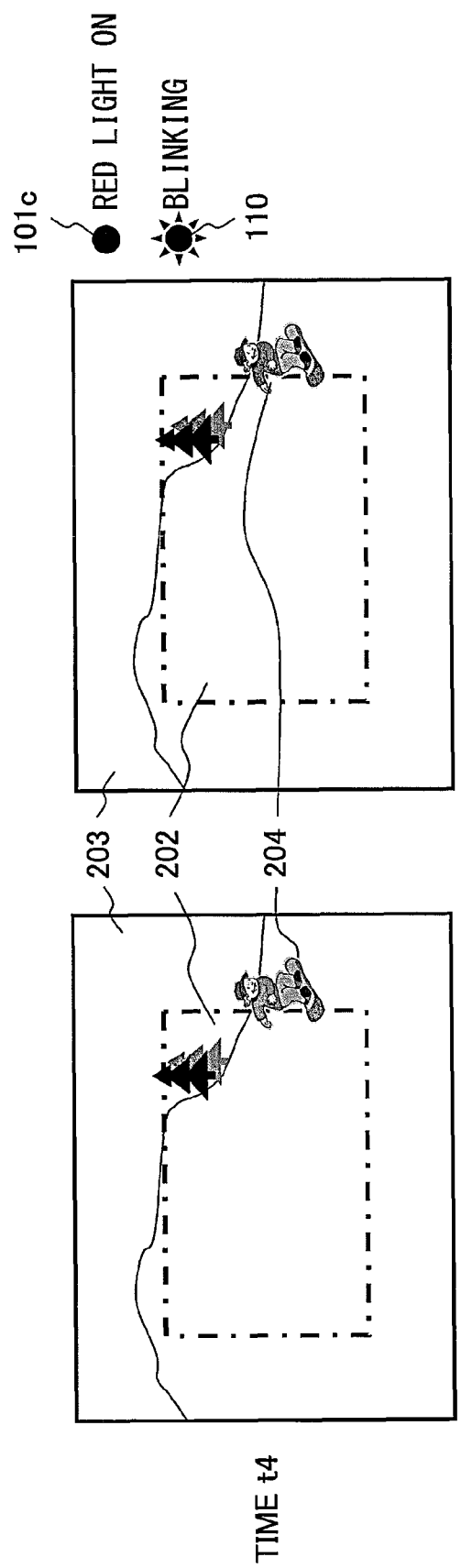
FIG. 5D is the fourth explanatory view of a transition example of the display in the track recording process according to the first embodiment.

However, at time t4 after time t3, since the main subject 204 still exists in the second area 203 as indicated in FIG. 5D, the announcement that the main subject 204 does not exist only in the first area 202 is issued as in FIG. 5B or FIG. 5C.

Then, at time t5 after time t4, since the main subject 204 does not exist in the second area 203 as in FIG. 5E, the announcement that the main subject 204 exists only in the first area 202 is issued to the user as in FIG. 5A.

Thus, in the track recording process, the back liquid crystal panel 118 or the EVF panel 126 is turned off when there is no possibility that the main subject runs out of the captured image, thereby realizing lower power consumption. On the other hand, when there is the possibility that the main subject 204 runs out of the captured image, the back liquid crystal panel 118 or the EVF panel 126 is turned on, thereby notifying the user of the possibility.

FIG. 6 (FIGS. 6A, 6B, and 6C) is an explanatory view of a setting example of a main subject.

A main subject is set by a user touching the desired subject 211 with his or her finger etc. on a through image when the through image is displayed on the back liquid crystal panel 118 as indicated in FIG. 6A. Otherwise, as indicated in FIG. 6B, when the through image is displayed on the back liquid crystal panel 118 or the EVF panel 126, the setting is made by pressing the release button 103 to the first step (half pressing) after determining the arrangement so that a desired subject 211 on the through image may be included in an auto focus (AF) frame 212 on the through image. The through image refers to an image displayed in real time depending on the subject image formed on the photo-reception surface of the CCD 123, and is also referred to as a live view image.

In the method above, the subject 211 is set as a main subject.

The main subject set as described above is set as a rectangular area (enclosed by four marks 213) enclosing the subject 211 as a main subject as indicated in FIG. 6C. The four marks 213 are not practically displayed.

Figure 7:
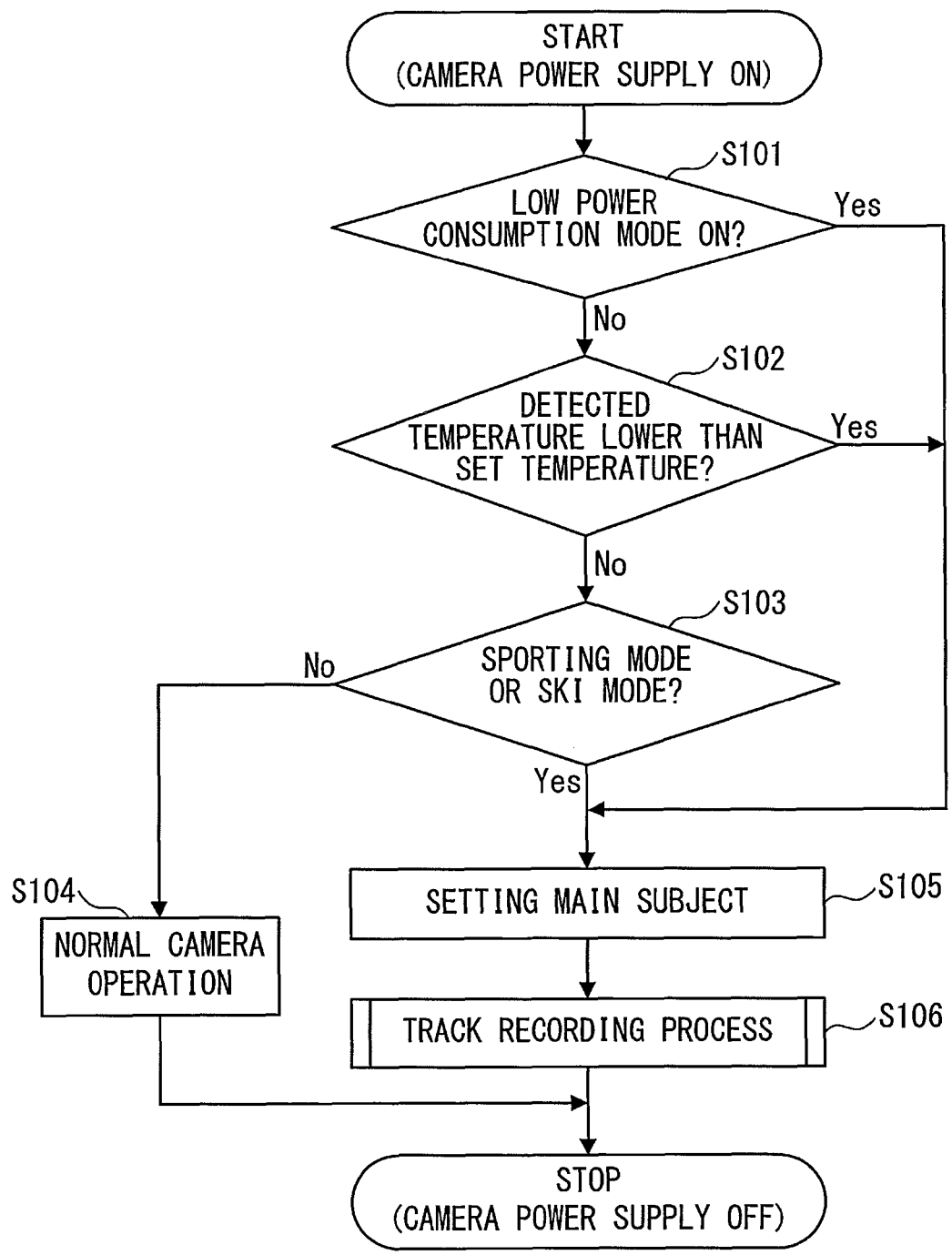
FIG. 7 is a flowchart of an operation example of the digital camera according to the first embodiment.

FIG. 7 is a flowchart of an operation example of the digital camera 100.

The flowchart realized by reading and executing the program stored in the FLASH memory 136 by the CPU 160.

As illustrated in FIG. 7, when the CPU 160 turns on the power supply after detecting the pressed power supply button 102 when the power supply of the digital camera 100 is in the OFF position, the display of the through image to the back liquid crystal panel 118 which is initialized as a destination on which display is performed is started, and the present operation is started. The destination on which display is performed may be changed to the EVF panel 126 by pressing the display switch button 109 as described above.

First, the CPU 160 judges whether or not the low power consumption mode is set in the ON state (S101). The ON/OFF state of the low power consumption mode may be optionally set by a user on the menu screen. When the low power consumption mode is set in the OFF state, a normal mode is set.

When the judgment result in S101 is NO, the CPU 160 judges whether or not the temperature detected by the temperature sensor 105 or the temperature sensor 130a of the battery 130 is lower than the specified temperature (for example, 5° C.) (S102). The specified temperature may be arbitrarily set by a user on the menu screen.

When the judgment result in S102 is NO, the CPU 160 judges whether or not the sporting mode or the ski mode is set (S103).

The sporting mode may be set by the mode dial 111 (SCN) and the menu screen as described above. The ski mode may be set by the mode dial 111 (SKI) as described above.

When the judgment result in S103 is NO, the CPU 160 performs a normal camera operation (normal mode) (S104).

When the judgment result any of S101 through S103 is YES, the CPU 160 sets the low power consumption mode as the operation mode, and performs the following operation. First, the CPU 160 performs the process of setting a main subject (S105). In this process, for example, the subject touched by a user is set as a main subject as indicated in FIG. 6A. Otherwise, as indicated in FIG. 6B, the subject in the AF frame when the user presses the release button 103 to the first stage (half pressed) is set as a main subject.

After S105, the CPU 160 performs the track recording process (S106). In this process, as described later in detail with reference to FIG. 8, moving images are shot while automatically tracking the main subject as described above with reference to FIGS. 4 and 5 depending on the pressing of the moving image record button 104.

Afterwards, the CPU 160 turns off the power supply of the digital camera 100 when the pressed power supply button 102 is detected, thereby terminating the present operation.

Figure 8:
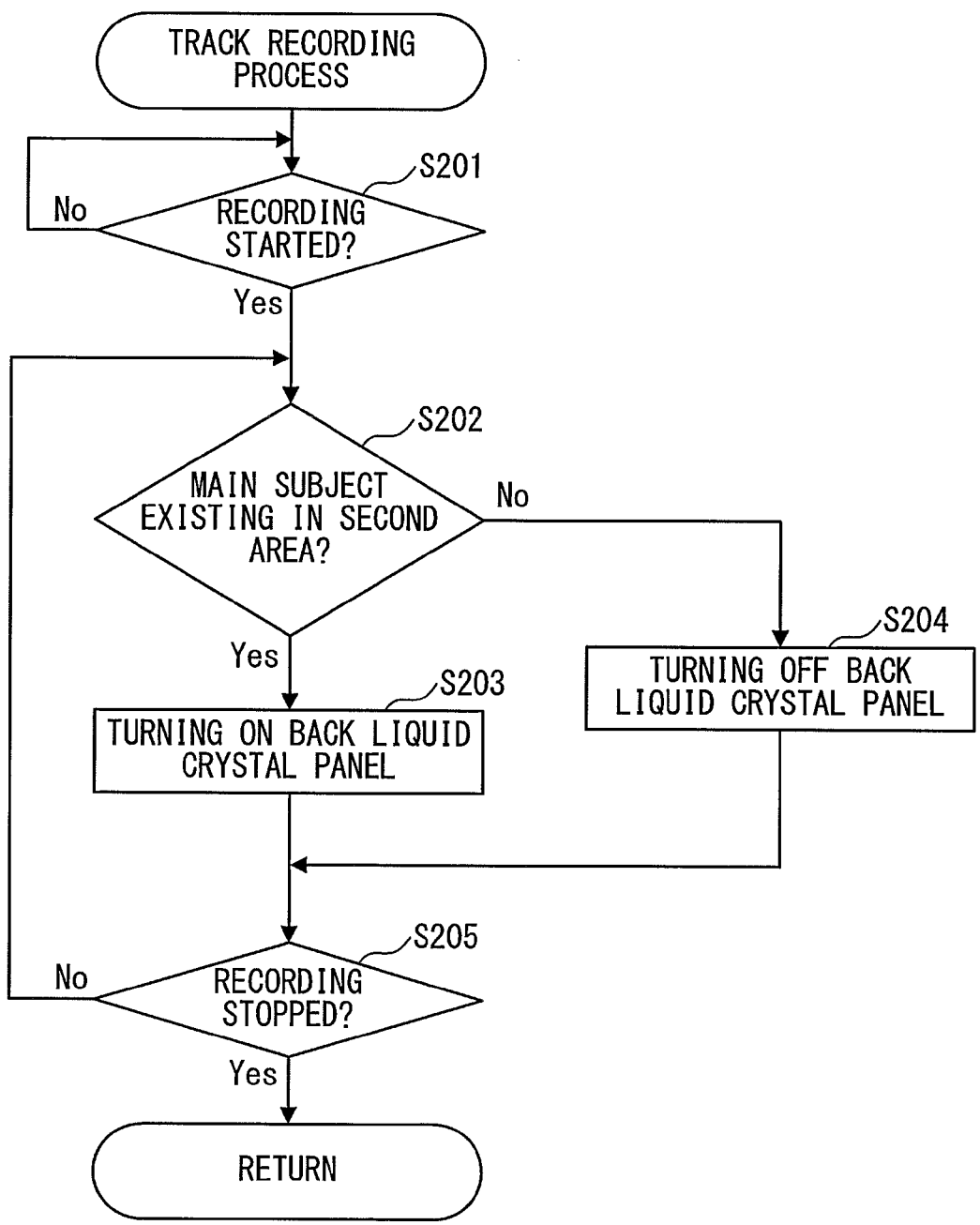
FIG. 8 is a flowchart of the details of the track recording process according to the first embodiment.

FIG. 8 is a flowchart of the details of the track recording process (S106).

As illustrated in FIG. 8, when the present process is started, the CPU 160 first judges whether or not the pressed moving image record button 104 has been detected (whether or not the recording process is to be started) (S201). The pressing of the moving image record button 104 with the timing above refers to the pressing of the moving image record button 104 while moving images are not shot. Therefore, it indicates the instruction to start recording moving images.

In the judgment in S201, when the judgment result is NO, the present judgment is repeated.

On the other hand, when the judgment result in S201 is YES, the CPU 160 starts recording moving images, and judges whether or not the main subject set in S105 in FIG. 7 exists in the second area set in advance (S202).

When the judgment result in S202 is YES, the CPU 160 turns on the (backlight 133 of the) back liquid crystal panel 118 (S203), blinks the indicator 110, and generates a warning sound by the speaker 112 as indicated by, for example, as illustrated in FIGS. 5B, 5C, and 5D.

When the judgment result in S202 is NO, the CPU 160 turns off the (backlight 133 of the) back liquid crystal panel 118 (S204), and turns on the indicator 110 as indicated by, for example, as illustrated in FIGS. 5A, and 5E.

Then, the CPU 160 judges whether or not the pressed moving image record button 104 has been detected (whether or not the recording process is to be stopped) (S205). The pressing of the moving image record button 104 with the timing above refers to the pressing of the moving image record button 104 while moving images are shot. Therefore, it indicates the instruction to stop recording moving images.

When the judgment result in S205 is NO, control is returned to S202.

On the other hand, when the judgment result in S205 is YES, the CPU 160 stops recording moving images, and the process is returned.

As described above, according to the present embodiment, the back liquid crystal panel 118 or the EVF panel 126 is turned off, thereby realizing low power consumption when there is no possibility that the main subject runs out of the captured image in the track recording process. On the other hand, when there is the possibility that the main subject 204 runs out of the captured image, the back liquid crystal panel 118 or the EVF panel 126 is turned on, the indicator 110 is blinked, or the indicator 101c is turned on (red light on), and a warning sound is generated by the speaker 112, thereby notifying the user of the possibility. Therefore, in the track recording process, the low power consumption may be realized without affecting the convenience of the user.

Second Embodiment

The digital camera as an imaging device according to the second embodiment is basically the same in configuration as the digital camera 100 as the imaging device according to the first embodiment, but is partly different in operation. Therefore, in the description of the second embodiment, the operation is mainly described. In the explanation of the second embodiment, the same component as the component of the digital camera 100 as the imaging device according to the first embodiment is assigned the same reference numeral.

First, the outline of the operation according to the second embodiment is explained with reference to FIGS. 9 and 10, and then the flowchart of the operation is explained with reference to FIG. 11.

Figure 9:
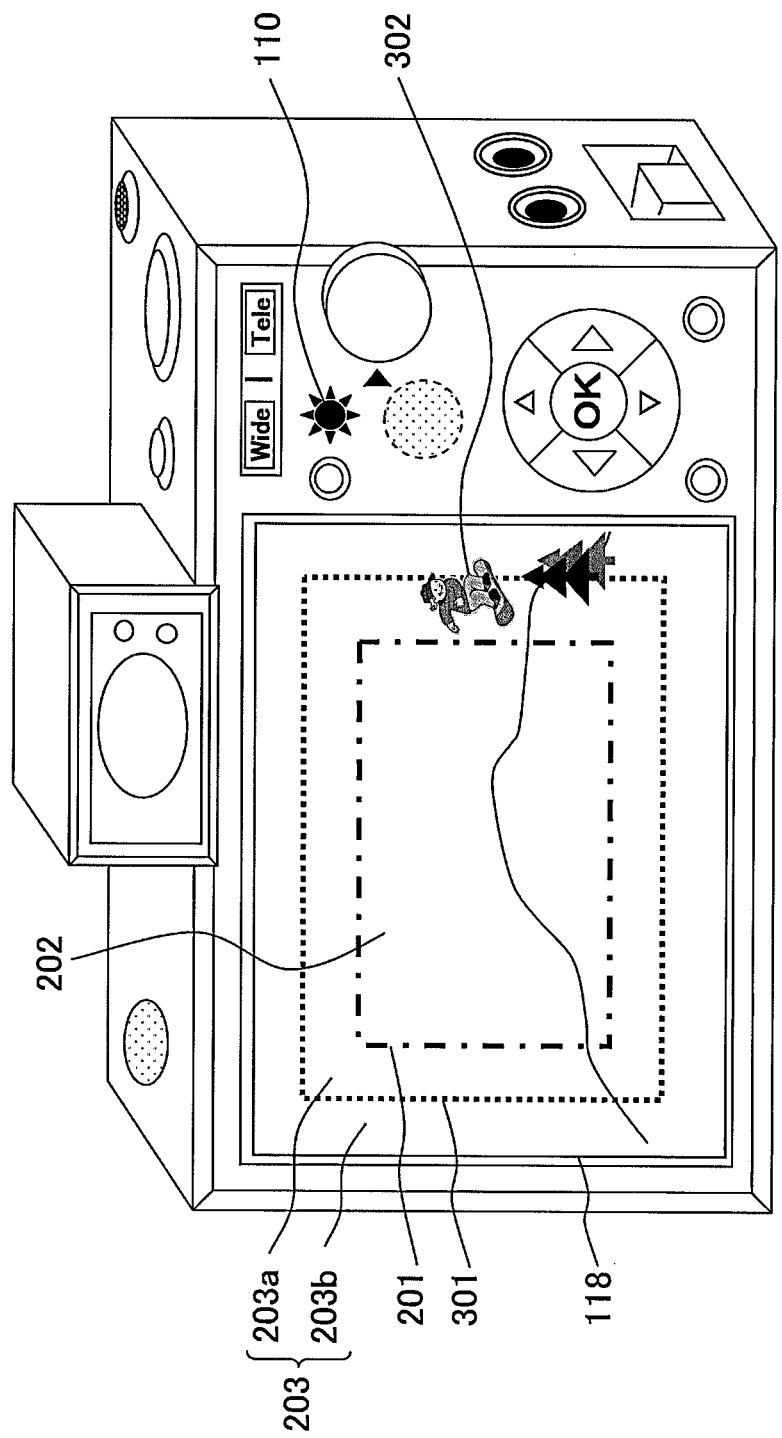
FIG. 9 is an explanatory view of a display example in the track recording process according to the second embodiment of the present invention.

FIG. 9 is an explanatory view of a display example in the track recording process according to the present embodiment.

In FIG. 9, an example of the case in which the destination on which display is performed is the back liquid crystal panel 118 is explained, but it is similar to the case in which the destination on which display is performed is the EVF panel 126.

In the track recording process, the captured image obtained in the moving image shooting operation, and the frame 201 indicated as a rectangle by alternate long and short dashed line, and a frame 301 indicated as a rectangle by dotted line superposed on the captured image are displayed. The frame 201 indicates the boundary between the first area 202 and the second area 203 set in advance on the captured image as described above with reference to the first embodiment. The frame 301 indicates the boundary between an inner area 203a and an outer area 203b set in advance in the second area 203. The inner area 203a is the area in the second area 203 closer to the center of the captured image. The outer area 203b is the area in the second area 203 farther from the center of the captured image, and is also the area in the second area 203 other than the inner area 203a.

Then, as illustrated in FIG. 9, when a subject 302 set as main subject in advance exists in the outer area 203b in the second area 203, the announcement that the main subject 302 does not exist only in the first area 202 is issued, and the position detection period of the main subject 302 is shortened (set as a period T1). As the announcement, the (backlight 133 of the) back liquid crystal panel 118 is turned on, the indicator 110 is quickly blinked, a warning sound is generated by the speaker 112, and the direction of the movement of the main subject 302 is displayed. However, in FIG. 9, for convenience of explanation, the display of the direction of the movement of the main subject 302 is omitted in the attached drawings, which is explained later with reference to FIG. 10. The case in which the main subject 302 exists in the outer area 203b in the second area 203 refers to the case in which, in more detail, all or a part of the area recognized as the main subject 302 exists in the outer area 203b in the second area 203. The announcement that the main subject 302 does not exist only in the first area 202 is also the announcement that there is the possibility that the main subject 302 runs out of the captured image.

On the other hand, although not illustrated in FIG. 9, when the main subject 302 does not exist in the outer area 203b in the second area 203, but exists in the inner area 203a, the announcement that the main subject 302 does not exist only in the first area 202 is issued, and the position detection period of the main subject 302 is shortened (the period T1 is set). As the announcement, the brightness of the (backlight 133 of the) back liquid crystal panel 118 is reduced, the indicator 110 is slowly blinked, and a warning sound by the speaker 112 is generated. The case in which the main subject 302 does not exist in the outer area 203b in the second area 203 but exists in the inner area 203a refers to, in more detail, the case in which all or a part of the area recognized as the main subject 302 does not exist in the outer area 203b in the second area 203, but exists in the inner area 203a.

Furthermore, although not illustrated in FIG. 9, when the main subject 302 does not exist in the second area 203, the announcement that the main subject 302 exists only in the first area 202 is issued, and the position detection period of the main subject 302 is extended (set as the period T2). As the announcement, the (backlight 133 of the) back liquid crystal panel 118 is turned off, and the indicator 110 is turned on.

FIG. 10 (FIGS. 10A, 10B, 10C, 10D, and 10E) is an explanatory view of a transition example of the display in the track recording process according to the present embodiment.

In FIGS. 10A, 10B, 10C, 10D, and 10E respectively indicate the display state at time t1, t2, t3, t4, and t5. In each of FIGS. 10A, 10B, 10C, 10D, and 10E, the left image indicates the display of the back liquid crystal panel 118 when the backlight 133 and the display of the direction of the movement of the main subject are ignored, or the display of the EVF panel 126 when the built-in backlight and the display of the direction of the movement of the main subject are ignored. Also in each of FIGS. 10A, 10B, 10C, 10D, and 10E, the right image indicates the display of the actual back liquid crystal panel 118, or the display of the EVF panel 126. The indicator 101c and the indicator 110 in each of FIGS. 10A, 10B, 10C, 10D, and 10E respectively indicate the state of the indicator 101c when the destination on which display is performed is the EVF panel 126, and the state of the indicator 110 when the destination on which display is performed is the back liquid crystal panel 118.

Figure 10A:
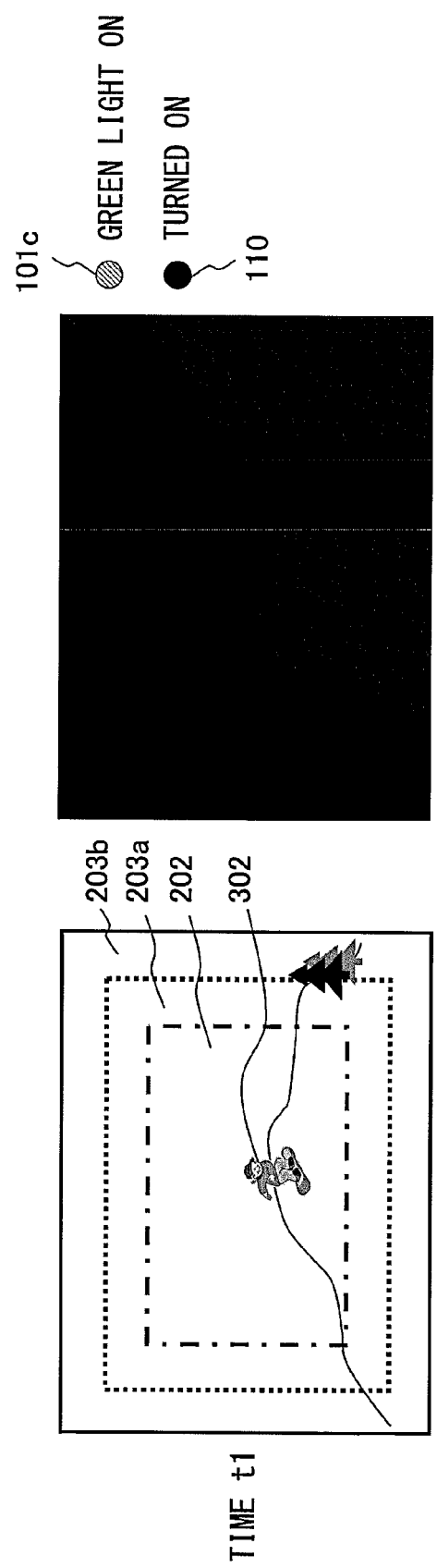
FIG. 10A is the first explanatory view of a transition example of the display in the track recording process according to the second embodiment.

At time t1, since the main subject 302 does not exist in the second area 203 as indicated in FIG. 10A, the announcement that the main subject 302 exists only in the first area 202 is issued and the position detection period of the main subject 302 is extended (set as the period T2). The announcement is issued as follows. That is, when the destination on which display is performed is the back liquid crystal panel 118, the (backlight 133 of the) back liquid crystal panel 118 is turned off, and the indicator 110 is turned on as the announcement. Otherwise, when the destination on which display is performed is the EVF panel 126, the (built-in backlight of the) EVF panel 126 is turned off, and the indicator 101c is turned on (green light on) as the announcement.

Figure 10B:
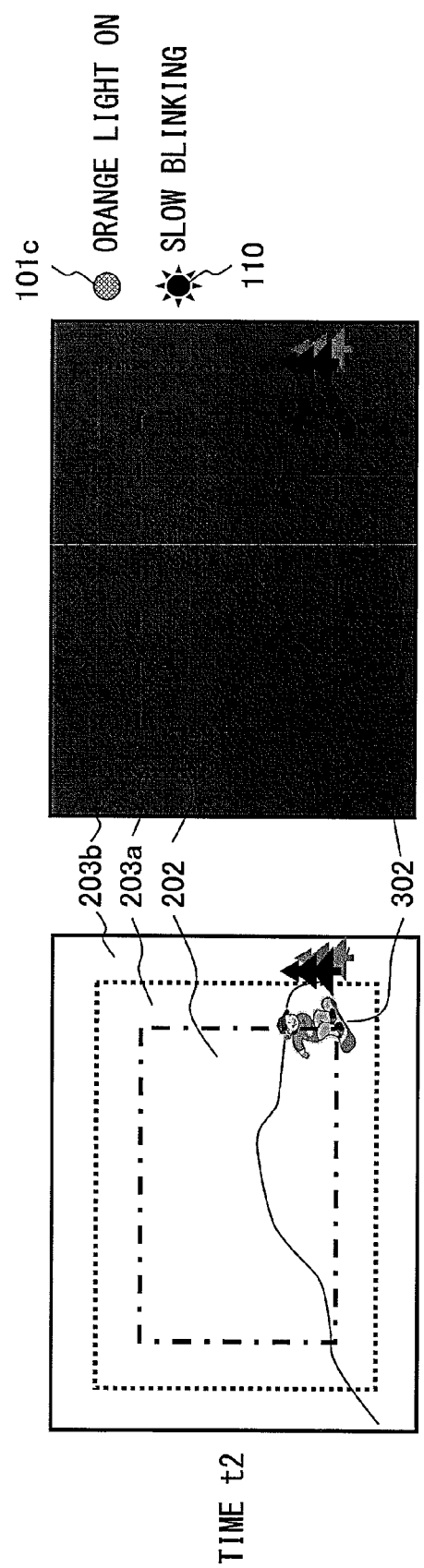
FIG. 10B is the second explanatory view of a transition example of the display in the track recording process according to the second embodiment.

At time t2 after time t1, since the main subject 302 does not exist in the outer area 203b in the second area 203 but exists in the inner area 203a as indicated in FIG. 10B, the announcement that the main subject 302 does not exist only in the first area 202 is issued and the position detection period of the main subject 302 is shortened (set as the period T1). The announcement is issued as follows. That is, when the destination on which display is performed is the back liquid crystal panel 118, the brightness of the (backlight 133 of the) back liquid crystal panel 118 is reduced, the indicator 110 is slowly blinked, and a warning sound is generated by the speaker 112 as the announcement. Otherwise, when the destination on which display is performed is the EVF panel 126, the brightness of the (built-in backlight of the) EVF panel 126 is reduced, the indicator 101c is turned on (orange light on), and a warning sound is generated by the speaker 112 as the announcement.

Figure 10C:
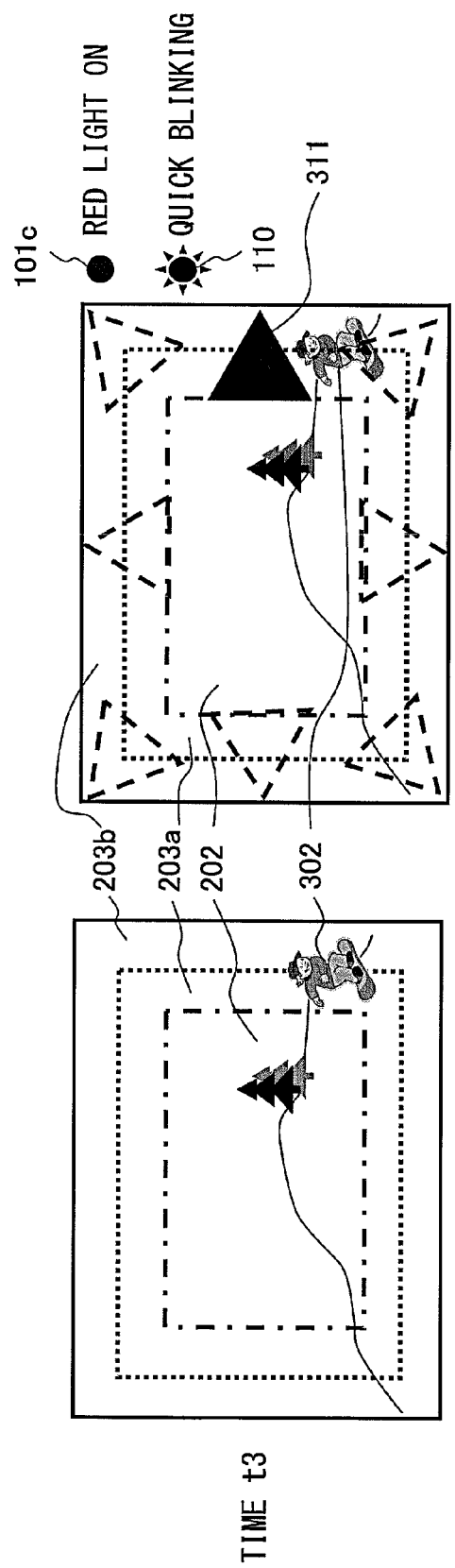
FIG. 10C is the third explanatory view of a transition example of the display in the track recording process according to the second embodiment.

At time t3 after time t2, since the main subject 302 exists in the outer area 203b in the second area 203 as indicated in FIG. 10C, the announcement that the main subject 302 does not exist only in the first area 202 is issued and the position detection period of the main subject 302 is shortened (set as the period T1). The announcement is issued as follows. That is, when the destination on which display is performed is the back liquid crystal panel 118, the (backlight 133 of the) back liquid crystal panel 118 is turned on, the indicator 110 is quickly blinked, a warning sound is generated by the speaker 112, and the direction of movement of the main subject 302 is displayed as the announcement. Otherwise, when the destination on which display is performed is the EVF panel 126, the (built-in backlight of the) EVF panel 126 is turned on, the indicator 101c is turned on (red light on), a warning sound is generated by the speaker 112, and the direction of movement of the main subject 302 is displayed. As the display of the direction of movement of the main subject 302, eight direction marks indicating eight directions are displayed as recognizable by a user that one of the marks is the mark indicating the direction of movement of the main subject 302. In FIG. 10C, a mark 311 in the eight direction marks is the mark indicating the direction of movement of the main subject 302.

Assume that the user has started panning the digital camera 100 to the right so that the main subject 302 does not deviate from the captured image. In this example, since the direction of movement of the main subject 302 is also displayed, the user may quickly judge in which direction the digital camera 100 is to be directed to prevent the main subject 302 from deviating from the captured image.

Figure 10D:
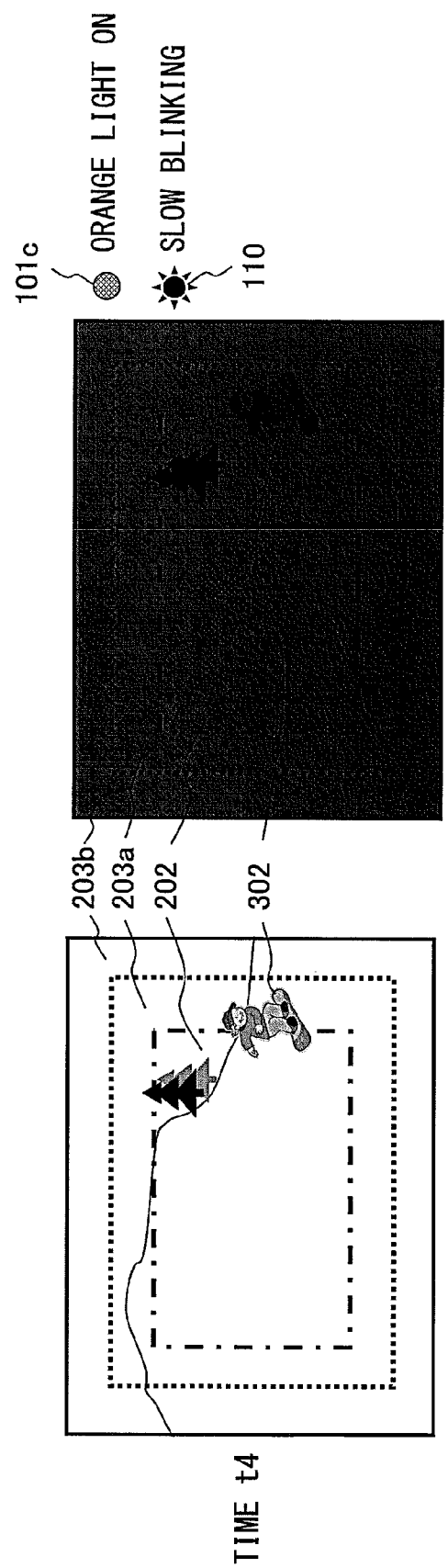
FIG. 10D is the fourth explanatory view of a transition example of the display in the track recording process according to the second embodiment.

However, at time t4 after time t3, since the main subject 302 still exists in the second area 203 as indicated in FIG. 10D, the announcement that the main subject 302 does not exist only in the first area 202 is issued as in FIG. 10B, and the position detection period of the main subject 302 is shortened (set as the period T1).

Then, at time t5 after time t4, since the main subject 302 does not exist in the second area 203 as in FIG. 10E, the announcement that the main subject 302 exists only in the first area 202 is issued as in FIG. 10A, and the position detection period of the main subject 302 is extended (set as the period T2).

Thus, in the track recording process, the back liquid crystal panel 118 or the EVF panel 126 is turned off and the position detection period of the main subject is extended when there is no possibility that the main subject runs out of the captured image, thereby realizing lower power consumption. On the other hand, when there is, more or less, the possibility that the main subject runs out of the captured image, the back liquid crystal panel 118 or the EVF panel 126 is turned on or the brightness of the panel is reduced, thereby notifying the user of the possibility, and shortening the position detection period of the main subject. When there is the possibility that the main subject deviates from the captured image, the direction of movement of the main subject is also displayed.

Figure 11:
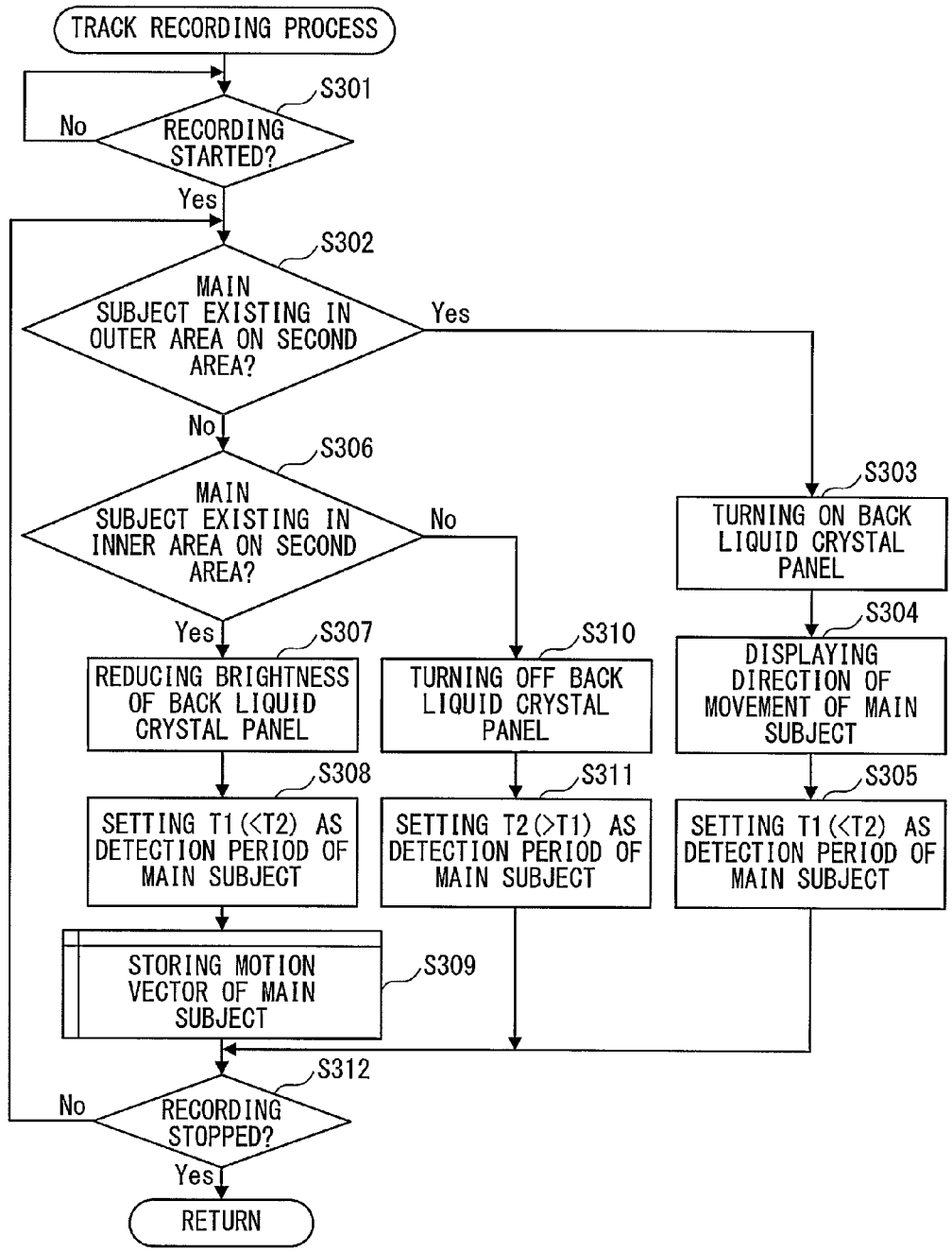
FIG. 11 is a flowchart of the details of the track recording process according to the second embodiment.

FIG. 11 is a flowchart of the details of the track recording process according to the second embodiment. The flowchart of the operation example of the digital camera 100 according to the present embodiment is the same as that illustrated in FIG. 7, but the contents of the track recording process in S106 are partly different as illustrated in FIG. 11.

As illustrated in FIG. 11, when the present process is started, the CPU 160 judges whether or not the pressed moving image record button 104 has been detected (whether or not the recording process has been started) (S301).

In the judgment in S301, when the judgment result is NO, the present judgment is repeated.

If the judgment result in S301 is YES, the CPU 160 starts recording moving images, and judges whether or not the main subject set in S105 in FIG. 7 exists in the outer area of the second area set in advance (S302).

When the judgment result in S302 is YES, the CPU 160 turns on the (backlight 133 of the) back liquid crystal panel 118 (S303), quickly blinks the indicator 110, and generates the warning sound by the speaker 112 as indicated in FIG. 10C. Furthermore, depending on the latest motion vector of the main subject stored in S309 described later, for example, as indicated in FIG. 10C, the CPU 160 displays the direction of movement of the main subject (S304). Furthermore, it shortens the period in which the automatically tracking operation unit 152a detects the position of the main subject (sets the period T1 (<T2)) (S305). The periods T1 and T2 may be arbitrarily set by a user on the menu screen.

On the other hand, when the judgment result in S302 is NO, the CPU 160 judges whether or not the main subject exists in the inner area of the second area set in advance (S306).

When the judgment result in S306 is YES, the CPU 160 reduces the brightness of the (backlight 133 of the) back liquid crystal panel 118 (S307), slowly blinks the indicator 110, and generates the warning sound by the speaker 112 as illustrated in the states (b) and (d) in FIG. 10. Furthermore, the CPU 160 shortens the period in which the automatically tracking operation unit 152a detects the position of the main subject (sets the period T1 (<T2)) (S308). In addition, it stores in, for example, the SDRAM 135 the information about the motion vector obtained by the motion vector operation unit 152b according to the information about the position of the main subject periodically detected by the automatically tracking operation unit 152a (S309).

On the other hand, when the judgment result in S306 is NO, the CPU 160 turns off the (backlight 133 of the) back liquid crystal panel 118 (S310) as illustrated in FIGS. 10A and 10E, and extends the period in which the automatically tracking operation unit 152a detects the position of the main subject (sets the period T2 (>t11)) (S311).

Afterwards, the CPU 160 judges whether or not the pressed moving image record button 104 has been detected (whether or not the recording process has been stopped) (S312).

When the judgment result in S312 is NO, control is returned to S302.

On the other hand, when the judgment result in S312 is YES, the CPU 160 stops recording moving images, and the present process is returned.

As described above, according to the present embodiment, when there is no possibility that the main subject runs out of the captured image in the track recording process, the back liquid crystal panel 118 or the EVF panel 126 is turned off and the position detection period of the main subject is extended, thereby realizing the low power consumption. On the other hand, when there is the possibility that the main subject runs out of the captured image, the back liquid crystal panel 118 or the EVF panel 126 is turned on, the indicator 110 is quickly blinked, or the indicator 101c is turned on (red light on), the warning sound is generated, and the direction of movement of the main subject is displayed, thereby notifying the user of the possibility. In addition, by the display of the direction of movement of the main subject, the user may quickly judge the direction of the digital camera 100 to prevent the main subject from deviating from the captured image. Therefore, in the track recording process, the low power consumption may be realized without affecting the convenience of the user.

In the operation according to the present embodiment, the following variation is applicable.

For example, in the track recording process illustrated in FIG. 11, the period in which the automatically tracking operation unit 152a detects the position of the main subject may be determined depending on the amount of position change per unit time on the captured image of the main subject. For example, when the amount of position change is not less than a specified amount, the period may be shortened (set as T1). When it is smaller than the specified amount, the period may be extended (set as T2). The reason is that there is the strong possibility that the main subject deviates from the captured image if the main subject moves quickly. The amount of position change per unit time on the captured image of the main subject is obtained from the information about the motion vector obtained by the motion vector operation unit 152*b* according to the information about the position of the main subject periodically detected by the automatically tracking operation unit 152*a*. Furthermore, the above-mentioned specified amount may be arbitrarily set by a user on the menu screen.

Furthermore, the operation of the digital camera 100 according to the present embodiment may be varied, for example, as follows.

FIG. 12 is a flowchart of an operation example of the digital camera 100 according to a variation example of the present embodiment.

In the flowchart illustrated in FIGS. 12, S105 and S106 in the flowchart in FIG. 7 are replaced with S401 through S403.

In S401, the CPU 160 performs the main subject setting process described later with reference to FIG. 13. In S402, the CPU 160 performs the area setting process described later with reference to FIG. 14. The area setting process is to set a first area, an inner area on the second area, and an outer area on the second area as described above. In S403, the CPU 160 performs the track recording process described later with reference to FIG. 15.

FIG. 13 is a flowchart of the details of the main subject setting process (S401) according to a variation example of the present embodiment.

As illustrated in FIG. 13, when the present process is started, the CPU 160 first judges whether or not the sporting mode or the ski mode is set (S501).

When the judgment result in S501 is YES, the CPU 160 judges whether or not the area of a certain rate on the captured image in the through image is an area recognizable as a face (S502).

On the other hand, then the judgment result in S501 is NO, the CPU 160 judges whether or not the area of the face which has been registered in advance exists in the captured image in the through image (S503). The registration of the face may be arbitrarily set by a user based on another image (an image shot by another digital camera etc.) on the menu screen.

When the judgment result in S503 is NO, the CPU 160 judges, as in S502, whether or not the area of a certain rate on the captured image in the through image is an area recognizable as a face (S504).

When the judgment result in S504 is NO, the CPU 160 judges whether or not the user has set the main subject (S505). The user sets the main subject, for example, as described above in FIGS. 6A and 6B.

When the judgment result in S505 or S502 is NO, the CPU 160 continues the display of the through image in the standby state (S506), and control is returned to S501.

Thus, when the main subject is not confirmed, the automatic tracking is not started.

On the other hand, if the judgment result of any of S505, S504, S503, and S502 is YES, the CPU 160 starts the automatic tracking of the main subject on the captured image in the through image (S507). Concretely, when the judgment result in S505 is YES, the automatic tracking of the main subject set by the user is started. When the judgment result in S504 is YES, the area recognizable as a face is set as a main subject, and the automatic tracking of the area is started. When the judgment result in S503 is YES, the registered face is set as a main subject, and the automatic tracking of the area is started. If the judgment result in S502 is YES, the area recognizable as a face is set as a main subject, and the automatic tracking of the area is started.

Thus, after the automatic tracking is started, control is returned to the present process.

Figure 14:
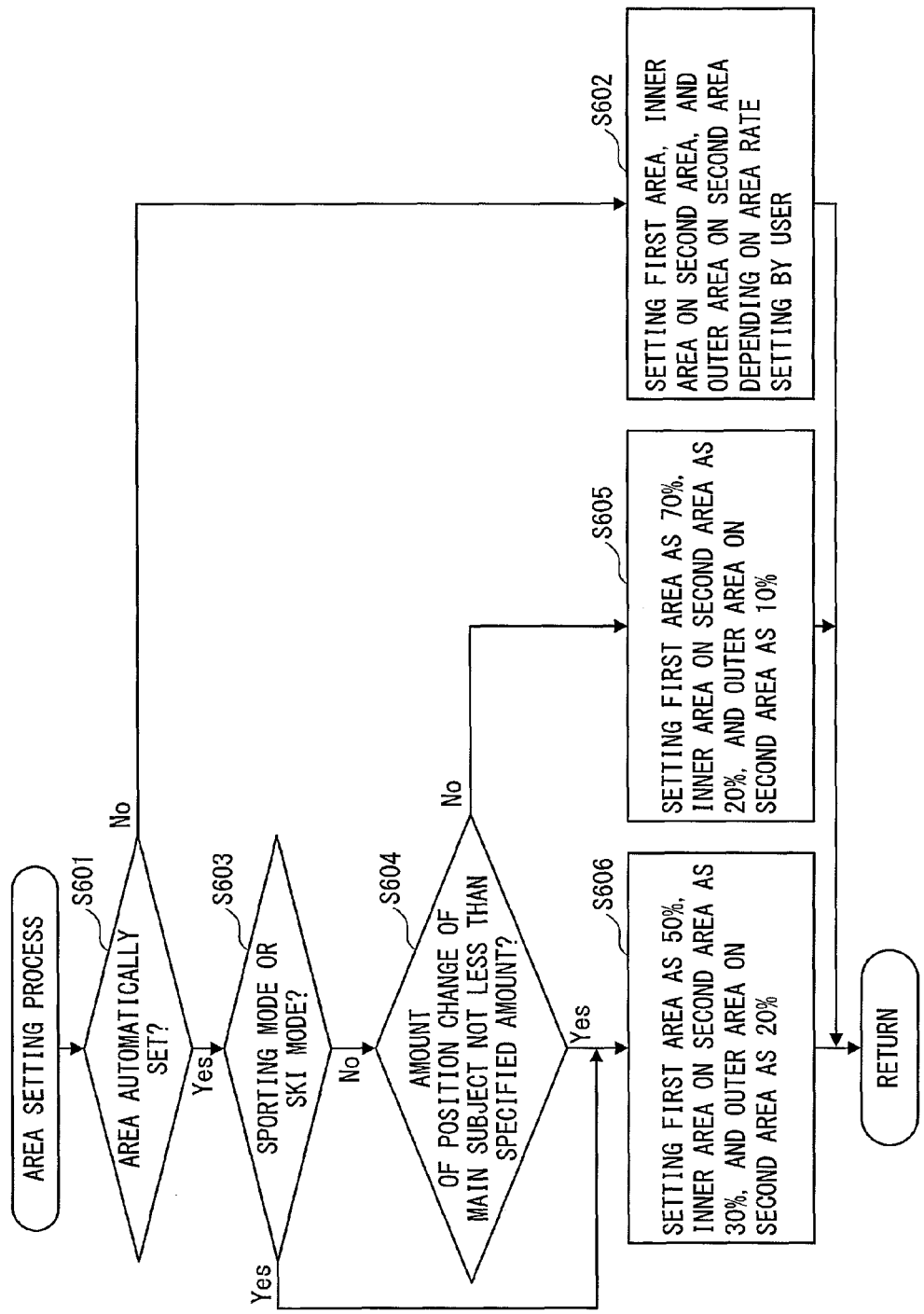
FIG. 14 is a flowchart of the details of the area setting process according to a variation example the second embodiment.

FIG. 14 is a flowchart of the details of the area setting process (S402) according to a variation example the present embodiment.

As illustrated in FIG. 14, when the present process is started, the CPU 160 first judges whether or not an area setting is automatically performed (S601). Whether an area is set automatically or manually may be arbitrarily set by a user on the menu screen.

When the judgment result in S601 is NO, the CPU 160 sets the first area, the inner area in the second area, and the outer area in the second area depending on the manual area rate setting by a user (S602). The manual area rate setting by a user may be arbitrarily performed by the user on the menu screen.

When the judgment result in S601 is YES, the CPU 160 judges whether or not the sports mode or the ski mode is set (S603).

When the judgment result in S603 is NO, the CPU 160 judges whether or not the amount of position change per unit time of the main subject being automatically tracked is not less than a specified amount (whether or not the moving speed of the main subject is higher than a specified speed) (S604). The amount of position change per unit time of the main subject being automatically tracked is obtained from the information about the motion vector obtained by the motion vector operation unit 152*b* according to the information about the position of the main subject periodically detected by the automatically tracking operation unit 152*a*. Furthermore, the above-mentioned specified amount may be arbitrarily set by a user on the menu screen.

Then the judgment result in S604 is NO, the CPU 160 sets the areas so that the rates of the first area, the inner area on the second area, and the outer area on the second area may be respectively 70%, 20%, and 10% (S605).

On the other hand, when the judgment result in S604 or S603 is YES, the CPU 160 sets the areas so that the rates of the first area, the inner area on the second area, and the outer area on the second area may be respectively 50%, 30%, and 20% (S606). Thus, when it is predicted that the main subject quickly moves, the rate of the second area is set high.

After S606, S605, or S602, the present process is returned.

Figure 15A:
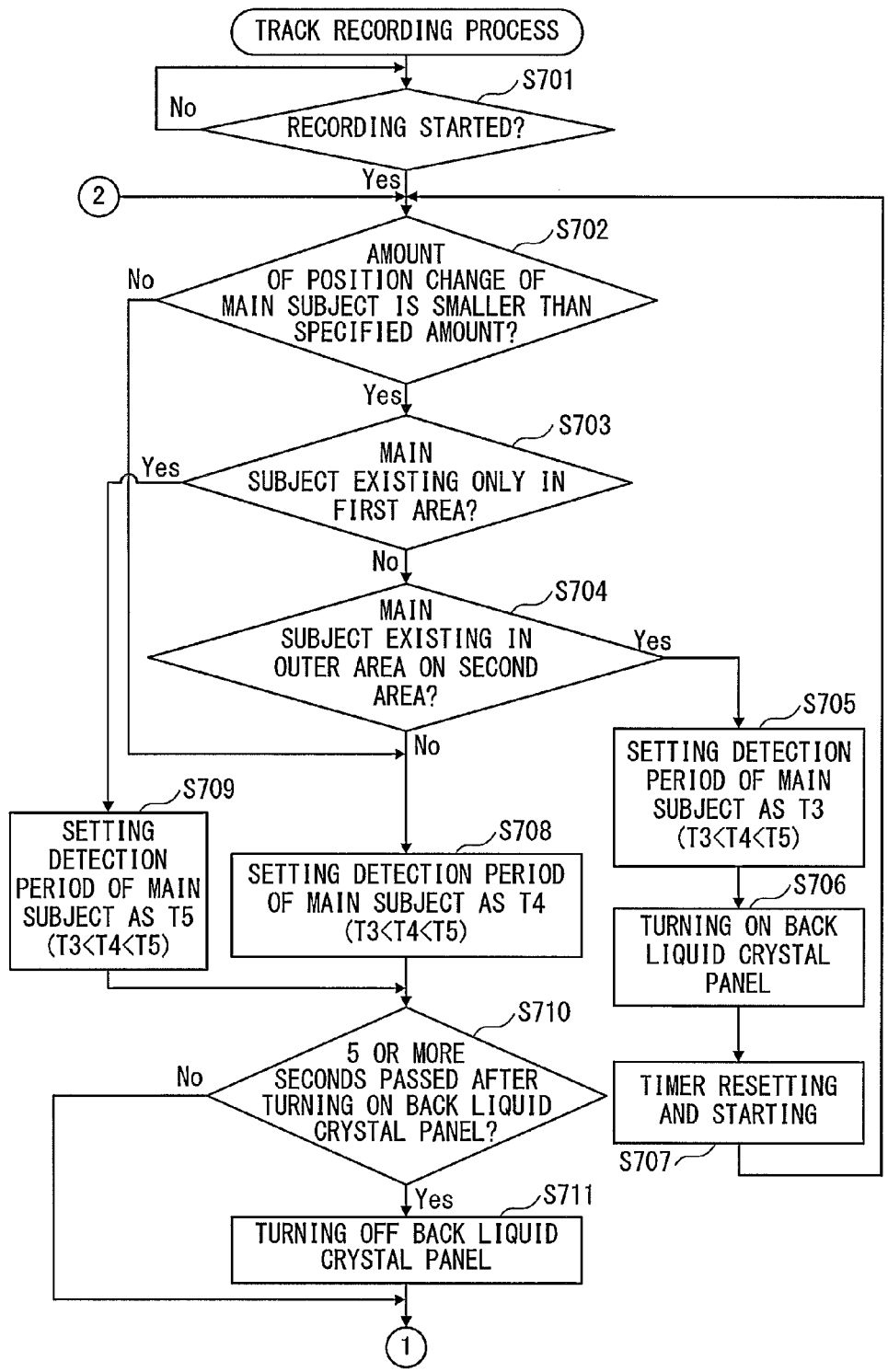
FIG. 15A is the first flowchart of the details of the track recording process according to a variation example of the second embodiment.
Figure 15B:
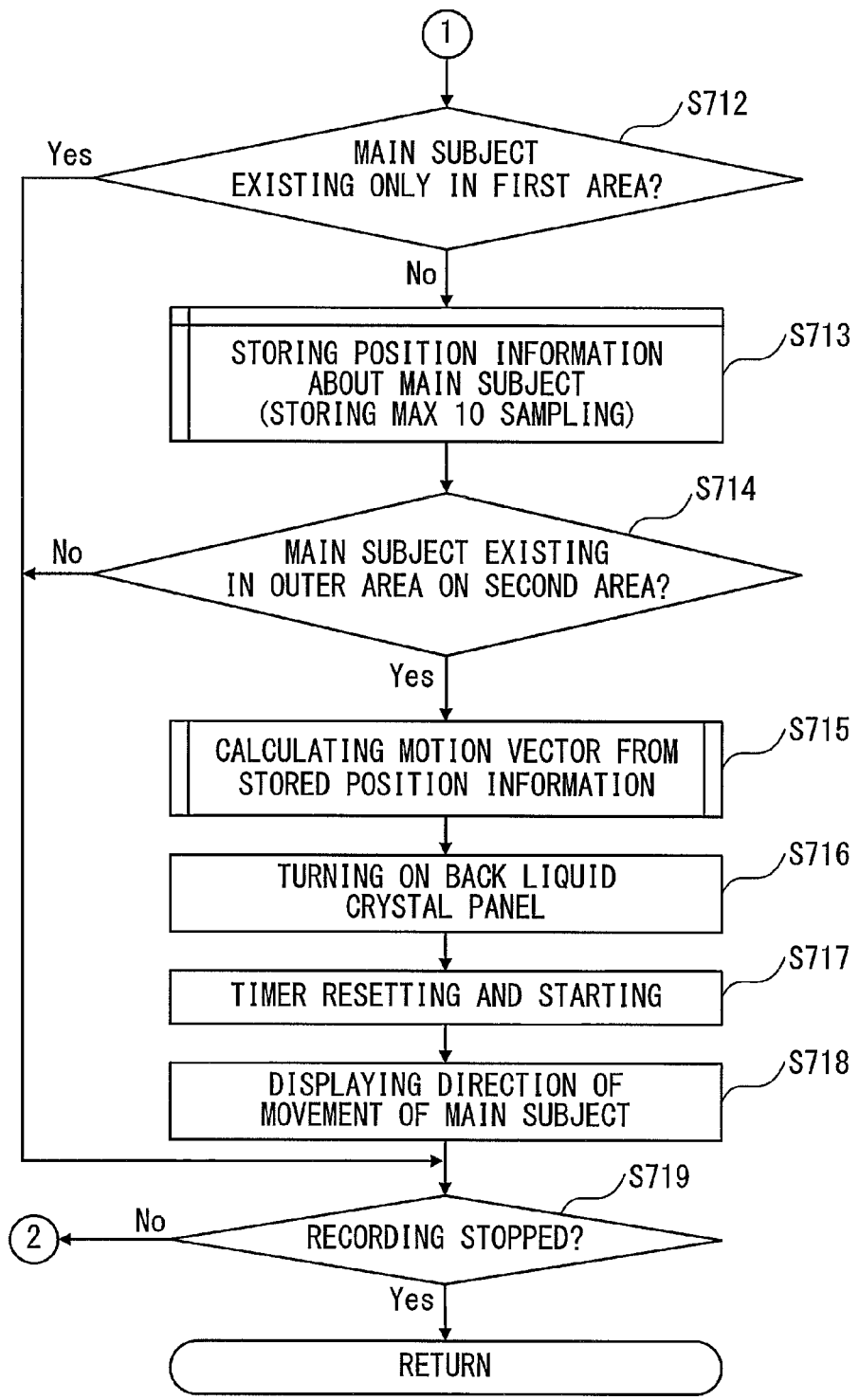
FIG. 15B is the second flowchart of the details of the track recording process according to a variation example of the second embodiment.

FIG. 15 (FIG. 15A, FIG. 15B) is a flowchart of the details of the track recording process (S403) according to the variation example according to the present embodiment.

As illustrated in FIG. 15, when the present process is started, the CPU 160 first judges whether or not the pressed moving image record button 104 has been detected (whether or not the recording process has been started) (S701).

If the judgment result in S701 is NO, the present judgment is repeated.

On the other hand, when the judgment result in S701 is YES, the CPU 160 starts recording moving images, and judges whether or not the amount of position change per unit time on the captured image of the main subject is smaller than a specified amount (whether or not the moving speed of the main subject is lower than the specified speed) (S702). The specified amount above may be arbitrarily set by a user on the menu screen.

When the judgment result in S702 is YES, the CPU 160 judges whether or not the main subject exists only in the first area (S703).

When the judgment result in S703 is NO, the CPU 160 judges whether or not the main subject exists in the outer area of the second area (S704).

When the judgment result in S704 is YES, the CPU 160 shortens the period in which the automatically tracking operation unit 152a detects the position of the main subject (sets the period T3) (S705). The period T3 indicates the relationship of T3<T4<T5 with respect to the periods T4 and T5 described later. The periods T3, T4, and T5 may be arbitrarily set by a user on the menu screen. Thus, in S705, if the amount of position change per unit time of the main subject is smaller than a specified amount (the moving speed of the main subject is lower than the specified speed), but the main subject exists in the outer area on the second area, then the position detection period of the main subject is shortened. The reason is that, for example, in S716 described later, the display of the more correct direction of movement of the main subject is prioritized. The display of the direction of movement of the main subject is performed depending on the motion vector obtained in S715 described later, and the motion vector is obtained based on the information about the position of the main subject periodically detected by the automatically tracking operation unit 152a. After S705, the CPU 160 turns on the (backlight 133 of the) back liquid crystal panel 118 (S706), blinks the indicator 110, and generates the warning sound by the speaker 112, and resets and starts the timer 158 (S707). Then, after S707, control is returned to S702.

On the other hand, when the judgment result in S704 or S702 is NO, the CPU 160 defaults the period in which the automatically tracking operation unit 152a detects the position of the main subject (sets the period T4) (S708).

When the judgment result in S703 is YES, the CPU 160 extends the period in which the automatically tracking operation unit 152a detects the position of the main subject (sets the period T5) (S709).

After S708 or S709, the CPU 160 judges based on the count value of the timer 158 whether or not 5 seconds have passed after the back liquid crystal panel 118 has been turned on in S706 or S716 described later (S710). However, when the back liquid crystal panel 118 has never been turned on in S706 or S716 in the track recording process illustrated in FIG. 15, the judgment result in S710 is recognized as YES. The 5 seconds above may be, for example, arbitrarily changed by a user on the menu screen. The reason for the judgment in S710 is that turning on and off of the back liquid crystal panel 118, blinking the indicator 110 and turning off the indicator 110, generating the warning sound by the speaker 112 and not generating the warning sound by the speaker 112, etc. are prevented from being performed frequently when, for example, the main subject repeats moving by existing or not existing in the outer area on the second area, etc.

When the judgment result in S710 is YES, the CPU 160 turns off the (backlight 133 of the) back liquid crystal panel 118 (S711), and turns on the indicator 110.

On the other hand, when the judgment result in S710 is NO, or after S711, the CPU 160 judges whether or not the main subject exists only in the first area (S712).

When the judgment result in S712 is NO, the CPU 160 stores in, for example, the SDRAM 135 the information about the main subject detected by the automatically tracking operation unit 152a (S713). However, the number of pieces of information about the position of the stored main subject is at maximum the amount of the stored information about the latest 10 positions.

After S713, the CPU 160 judges whether or not the main subject exists in the outer area on the second area (S714).

When the judgment result in S714 is YES, the CPU 160 controls the motion vector operation unit 152b so that the motion vector of the main subject may be obtained from the stored information about a plurality of (for example, 10) latest positions of the main subject (S715). The accuracy of the motion vector obtained by the motion vector operation unit 152b is the higher when the period in which the automatically tracking operation unit 152a detects the position of the main subject is the shorter. After S715, the CPU 160 turns on the (backlight 133 of the) back liquid crystal panel 118 (S716), blinks the indicator 110, and generates the warning sound by the speaker 112, thereby resetting and starting the timer 158 (S717). Then, the CPU 160 displays the direction of movement of the main subject depending on the motion vector of the main subject obtained in S715 as illustrated in, for example, as illustrated in FIG. 10C (S718).

After S718, when the judgment result in S714 is NO, or the judgment result in S712 is YES, the CPU 160 judges whether or not the pressed moving image record button 104 has been detected (whether or not the recording process is stopped) (S719).

When the judgment result in S719 is NO, control is returned to S302.

On the other hand, when the judgment result in S719 is YES, the CPU 160 stops recording moving images, and the present process is returned.

As described above, according to a variation example of the present embodiment, the main subject may be more flexibly set in the main subject setting process illustrated in FIG. 13.

Furthermore, in the area setting process illustrated in FIG. 14, the first area and the second area (inner area, outer area) may be more flexibly set.

Furthermore, in the track recording process illustrated in FIG. 15, when there is no possibility that the main subject deviates from the captured image in the present process, and only when five or more seconds have passed after the lighting, the back liquid crystal panel 118 or the EVF panel 126 is turned off, and the position detection period of the main subject is extended, thereby realizing the low power consumption. Furthermore, when there is a small possibility that the main subject deviates from the captured image, and only when five or more seconds have passed after the lighting, the back liquid crystal panel 118 or the EVF panel 126 is turned off, thereby realizing the low power consumption. In addition, only when five or more seconds have passed after the lighting, the back liquid crystal panel 118 or the EVF panel 126 is turned off, thereby preventing the lighting and turning off the light from being repeated. On the other hand, when there is the possibility that the main subject deviates from the captured image, the back liquid crystal panel 118 or the EVF panel 126 is turned on, the indicator 110 is blinked or the indicator 101c is turned on (red light on), a warning sound is generated, and the direction of movement of the main subject is displayed, thereby notifying the user of the possibility. Furthermore, when there is the possibility that the main subject deviates from the captured image although the main subject moves slowly, the position detection period of the main subject is shortened, thereby improving the accuracy of the direction of movement of the main subject displayed depending on the motion vector obtained then. Therefore, in the track recording process, the low power consumption may be realized without affecting the convenience of the user.

Third Embodiment

The digital camera according to the third embodiment is basically the same in configuration as the digital camera 100 as an imaging device according to the second embodiment, but is partly different in operation. Therefore, in the description of the third embodiment, the operation is mainly explained. In the explanation of the third embodiment, the same component as the component of the digital camera 100 as the imaging device according to the second embodiment is assigned the same reference numeral.

First, the outline of the operation according to the third embodiment is explained with reference to FIGS. 16 through 18, and then the flowchart of the operation is explained with reference to FIG. 19.

Figure 16:
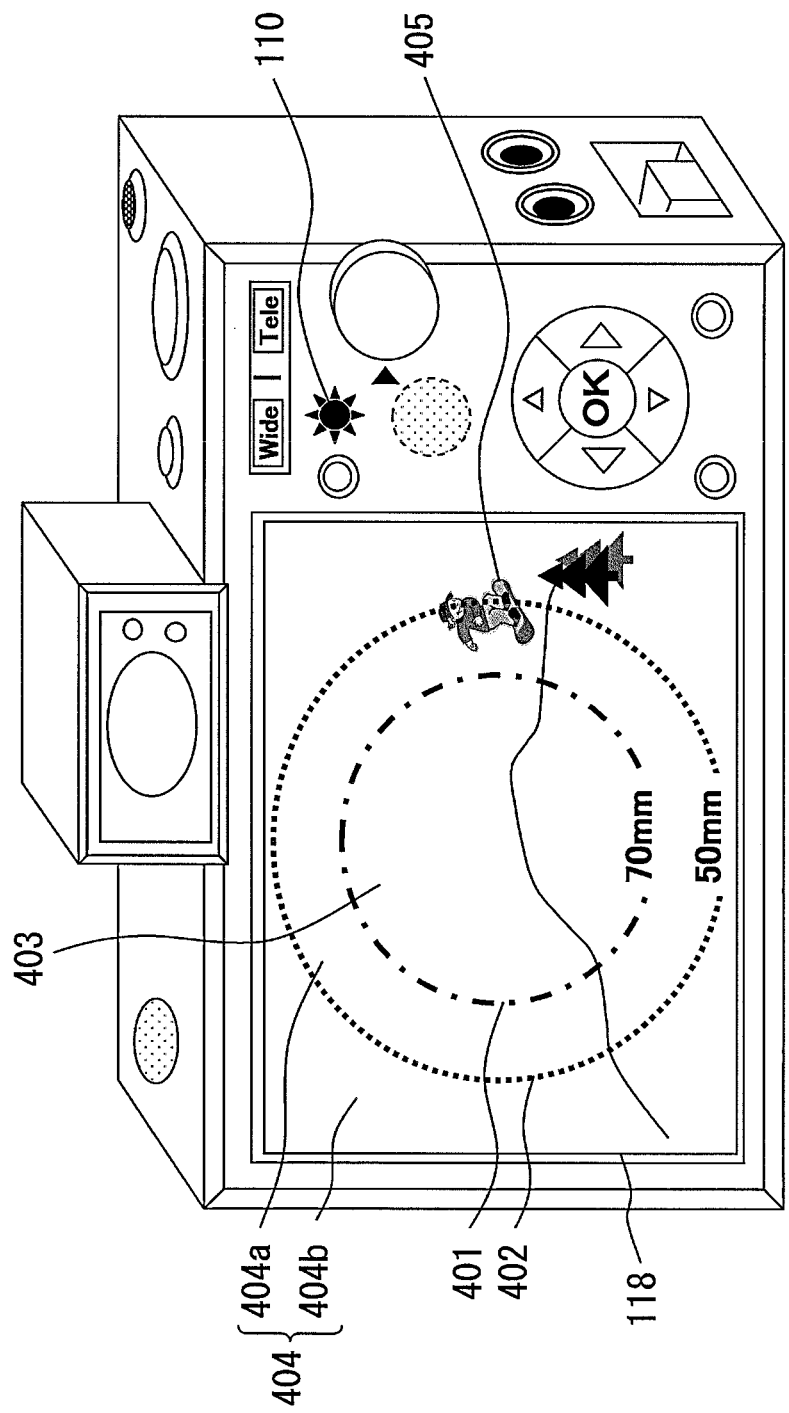
FIG. 16 is an explanatory view of a display example in the track recording process according to the third embodiment of the present invention.
Figure 18:
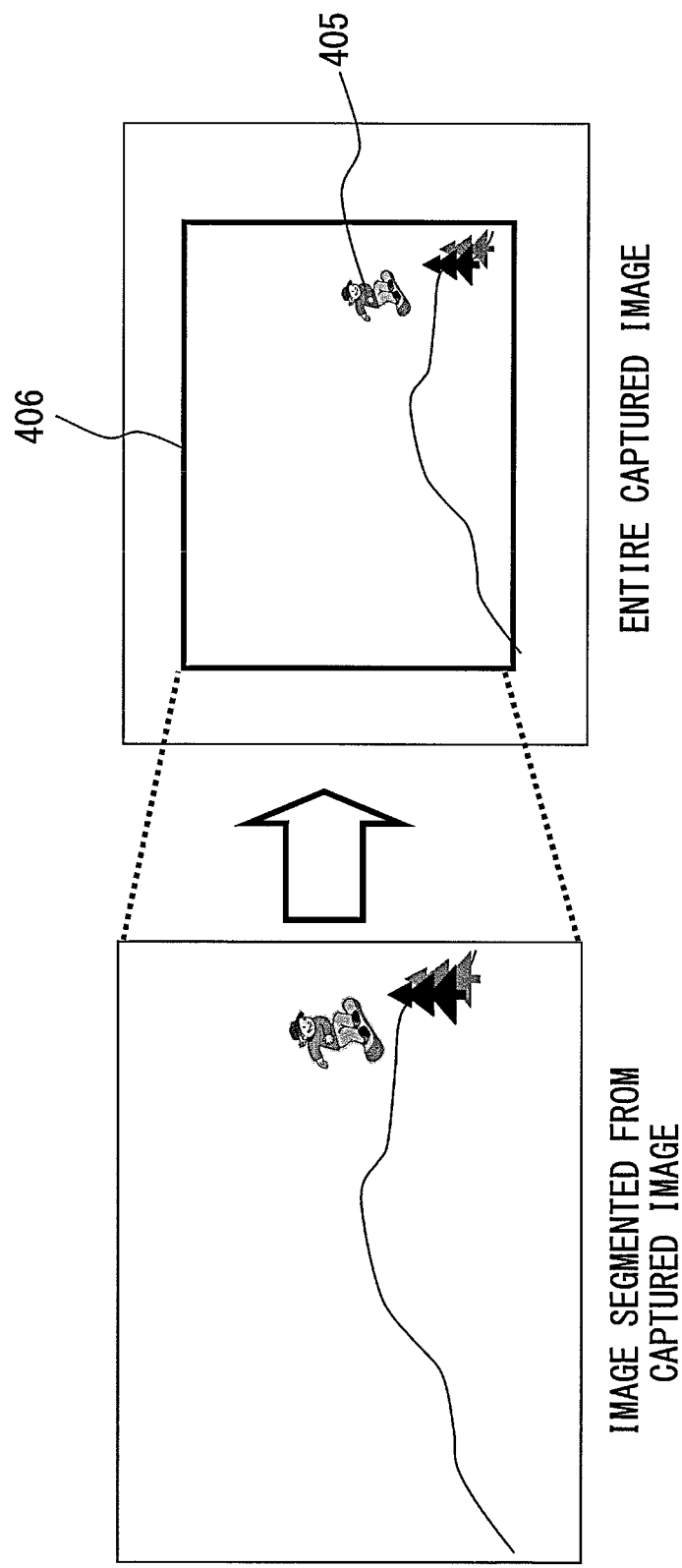
FIG. 18 is an explanatory view of a display example in the track recording process according to the third embodiment.

FIGS. 16 through 18 are explanatory views of display examples in the track recording process according to the present embodiment.

In FIGS. 16 through 18, an example of the case in which the destination on which display is performed is the back liquid crystal panel 118 is explained, but it is similar to the case in which the destination on which display is performed is the EVF panel 126.

In the track recording process, the captured image obtained in the moving image shooting operation, and a frame 401 indicated as a circle by alternate long and short dashed line, a frame 402 indicated as a circle by dotted line, and a focal distance (70 mm, 50 mm in the present example) corresponding to the frames 401 and 402 superposed on the captured image are displayed. The frame 401 indicates the boundary between a first area 403 and a second area 404 set in advance on the captured image. The frame 402 indicates the boundary between an inner area 404a and an outer area 404b set in advance in the second area 404. The inner area 404a is the area in the second area 404 closer to the center of the captured image. The outer area 404b is the area in the second area 404 farther from the center of the captured image, and is also the area in the second area 404 other than the inner area 404a. The focal distance corresponding to the frame 401 is a focal distance corresponding to the shooting range in the frame 401. The focal distance corresponding to the frame 402 is a focal distance corresponding to the shooting range in the frame 402.

Then, as illustrated in FIG. 16, when a subject 405 set as a main subject in advance exists in the outer area 404b on the second area 404, the following operation is performed depending on the state of the electronic variable power and the optical variable power.

When both of the electronic variable power and the optical variable power are in the state on the widest angle side, the (backlight 133 of the) back liquid crystal panel 118 is turned on, the indicator 110 is blinked, and a warning sound is generated by the speaker 112 as illustrated in FIG. 16 as the announcement that the main subject 405 does not exist only in the first area 403.

On the other hand, when the electronic variable power is in the state on the widest angle side and the optical variable power is not in the state on the widest angle side, the optical variable power is applied on the wide angle side, and correspondingly the focal distance corresponding to the frames 401 and 402 is changed. Thus, the captured image after applying the variable power is displayed, and in the example illustrated in FIG. 17, the focal distance corresponding to the frame 401 is changed from 70 mm to 50 mm, and the focal distance corresponding to the frame 402 is changed from 50 mm to 42 mm. In the example illustrated in FIG. 17, the focal distance of the captured image before applying the variable power is 42 mm, and the focal distance of the captured image after applying the variable power is 35 mm. As a result of the variable power, when the main subject 405 does not exist in the outer area 404b on the second area 404 as illustrated in FIG. 17, the (backlight 133 of the) back liquid crystal panel 118 is turned off, and the indicator 110 is turned on as the announcement of the non-existence although not illustrated in the attached drawings. The announcement is also an announcement that there is no possibility that the main subject 405 deviates from the captured image.

When the electronic variable power is not in the state on the widest angle side, the electronic variable power is applied to the wide angle side as illustrated in FIG. 18. Thus, the segmented area of the captured image is changed to the wide angle side, and the changed segmented area is displayed. Furthermore, in the example illustrated in FIG. 18, the segmented area after the change is the entire captured image. A frame 406 indicates a segmented area before the change, and is not practically displayed. Furthermore, the electronic variable power is applied to the wide angle side, and correspondingly the focal distance corresponding to the frames 401 and 402 is changed. However, in FIG. 18, for convenience of explanation, the frames 401 and 402, and the corresponding focal distance are omitted on the display. Only when the electronic variable power is not in the state on the widest angle side, the first area 403 and the second area 404 (inner area 404a, outer area 404b) are set on the area segmented from the captured image. Furthermore, as a result of changing the segmented area, when the main subject 405 does not exist in the outer area 404b on the second area 404, the (backlight 133 of the) back liquid crystal panel 118 is turned off and the indicator 110 is turned on as the announcement of the non-existence although not illustrated in the attached drawings.

Figure 19:
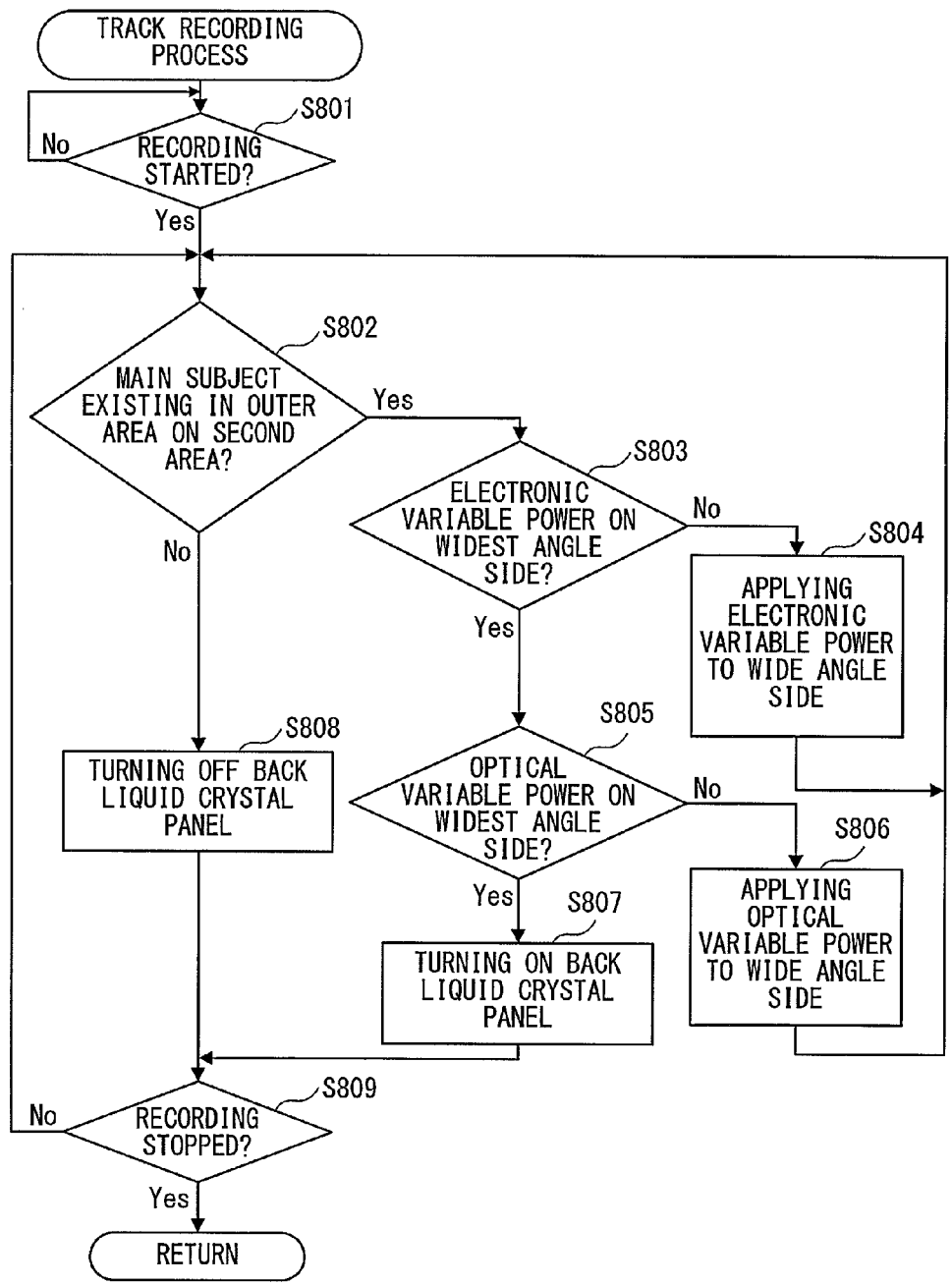
FIG. 19 is a flowchart of the details of the track recording process according to the third embodiment.

On the other hand, the (backlight 133 of the) back liquid crystal panel 118 is turned off and the indicator 110 is turned on as the announcement of the non-existence although not illustrated in the attached drawings when the main subject 405 does not exist in the outer area 404b on the second area 404, FIG. 19 is a flowchart of the details of the track recording process according to the present embodiment. The flowchart of the operation example of the digital camera 100 according to the present embodiment is the same as FIG. 7 or 12, but the contents of the track recording process in S106 or S403 are partly different as illustrated in FIG. 19.

As illustrated in FIG. 19, when the present process is started, the CPU 160 first judges whether or not the pressed moving image record button 104 has been detected (whether or not the recording process has been started) (S801).

When the judgment result is NO in the judgment in S801, the present judgment is repeated.

On the other hand, when the judgment result in S801 is YES, the CPU 160 starts recording moving images, and judges whether or not the main subject exists in the outer area on the second area (S802).

When the judgment result in S802 is YES, the CPU 160 judges whether or not the electronic variable power is in the state on the widest angle side (S803).

When the judgment result in S803 is NO, the CPU 160 applies the electronic variable power on the wide angle side (S804). Thus, the segmented area of the captured image is changed to the wide angle side, and the changed segmented area is displayed as illustrated in FIG. 18. Furthermore, the focal distance corresponding to two frames is changed correspondingly. After S804, control is returned to S802.

On the other hand, when the judgment result in S803 is YES, the CPU 160 judges whether or not the optical variable power is in the state on the widest angle side (S805).

When the judgment result in S805 is NO, the CPU 160 applies the optical variable power to the wide angle side (S806). Thus, for example, as illustrated in FIG. 17, the captured image after applying the variable power is displayed, and the focal distance corresponding to the two frames is changed. After S806, control is returned to S802.

When the judgment result in S805 is YES, the CPU 160 turns on the (backlight 133 of the) back liquid crystal panel 118 (S807), blinks the indicator 110, and generates the warning sound by the speaker 112.

On the other hand, when the judgment result in S802 is NO, the CPU 160 turns off the (backlight 133 of the) back liquid crystal panel 118 (S808), and turn on the indicator 110.

Afterwards, the CPU 160 judges whether or not the pressed moving image record button 104 has been detected (whether or not the recording process has been stopped (S809).

When the judgment result in S809 is NO, control is returned to S802.

On the other hand, when the judgment result in S809 is YES, the CPU 160 stops recording moving images, thereby returning the present process.

As described above, in the track recording process according to the present embodiment, when there is not the possibility that the main subject deviates from the captured image, the back liquid crystal panel 118 or the EVF panel 126 is turned off, thereby realizing the low power consumption. On the other hand, when the electronic variable power and the optical variable power are in the state on the widest angle side and there is the possibility that the main subject deviates from the captured image, the back liquid crystal panel 118 or the EVF panel 126 is turned on, the indicator 110 is blinked or the indicator 101c is turned on (red light on), and the warning sound is generated by the speaker 112, thereby notifying the user that there is the possibility that the main subject deviates from the captured image. If the electronic variable power is in the state on the widest angle side, the optical variable power is not in the state on the widest angle side, and there is the possibility that the main subject deviates from the captured image, then the optical variable power is applied to the wide angle side, and correspondingly the display of the back liquid crystal panel 118 or the EVF panel 126 is changed. Furthermore, if the electronic variable power is not in the widest angle side and there is the possibility that the main subject deviates from the area from which it has been segmented, then the electronic variable power is applied to the wide angle side, and correspondingly the display of the back liquid crystal panel 118 or the EVF panel 126 is changed. Therefore, in the track recording process, the low power consumption may be realized without affecting the convenience of a user.

In the operation according to the present embodiment, the following variation may be realized.

For example, in the judgment in S802 in the track recording process illustrated in FIG. 19, it may be judged whether or not the main subject exists in the second area instead of judging whether or not the main subject exists in the outer area in the second area. Thus, the processes in and after S803 may be performed when the main subject exists further in the inner area in the second area.

Furthermore, for example, the two frames displayed in the track recording process (for example, refer to the frames 401 and 402 illustrated in FIG. 16) are not limited to circles but the first area and the second area (inner area, outer area) may be set as other shapes such as oval etc.

Figure 20:
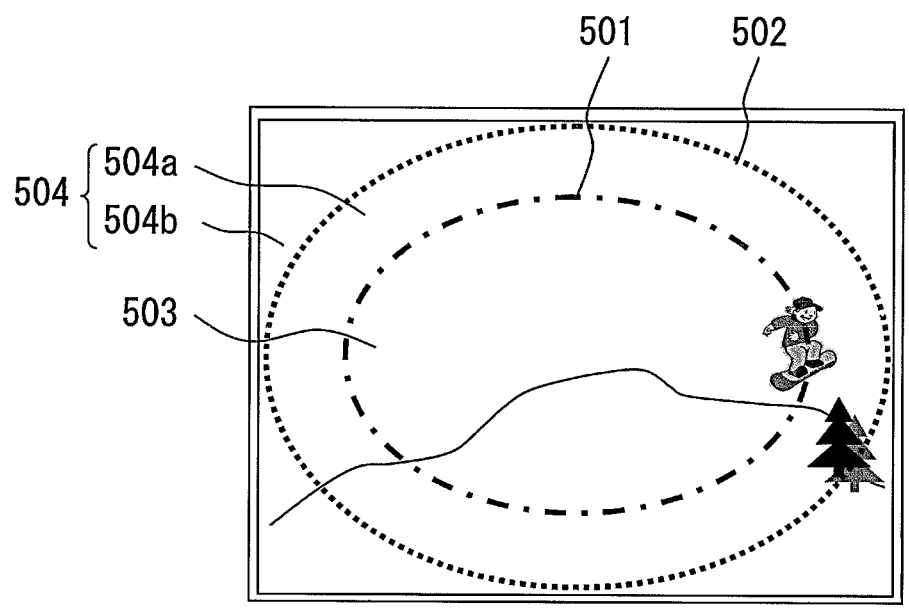
FIG. 20 is an explanatory view of an example of setting a first area and a second area (inner area, outer area) so that two frames may be oval according to the third embodiment.

FIG. 20 is an explanatory view of an example of setting the first area and the second area (inner area, outer area) so that two frames may be oval. The example illustrated in FIG. 20 indicates the display of the back liquid crystal panel 118 when the backlight 133 is ignored, or the display of the EVF panel 126 when the built-in backlight is ignored.

As illustrated in FIG. 20, in the present embodiment, an oval frame 501 by alternate long and short dashed line and an oval frame 502 by dotted line are superposed and displayed with a captured image obtained by shooting moving images. The frame 501 indicates the boundary between a first area 503 and a second area 504 set in advance on the captured image. The frame 502 indicates the boundary between an inner area 504a and an outer area 504b set in advance in the second area 504. The inner area 504a is the area in the second area 504 closer to the center of the captured image. The outer area 504b is the area in the second area 504 farther from the center of the captured image, and is also the area in the second area 504 other than the inner area 504a.

In addition to the configuration illustrated in FIG. 20, for example, the second area (inner area, outer area) relative to the first area may be provided on the left and right to the captured image (corresponding to the direction of pan of the digital camera 100) or above and below (corresponding to the direction of tilt of the digital camera 100).

Figure 21:
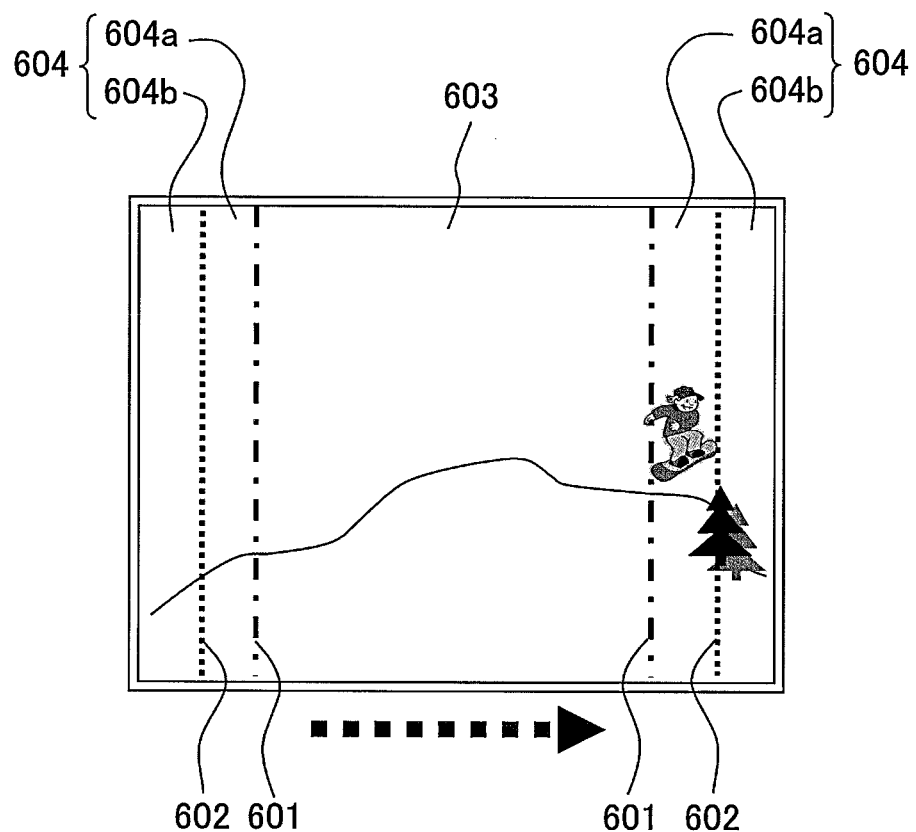
FIG. 21 is an explanatory view of an example of setting the second area (inner area, outer area) with respect to the first area on the left and right of the captured image according to a variation example of the third embodiment.

FIG. 21 is an explanatory view of an example of setting the second area (inner area, outer area) with respect to the first area on the left and right of the captured image. The example illustrated in FIG. 21 indicates the display of the back liquid crystal panel 118 when the backlight 133 is ignored, or the display of the EVF panel 126 when the built-in backlight is ignored.

As illustrated in FIG. 21, in the present embodiment, a line 601 by alternate long and short dashed line and a line 602 by dotted line are superposed and displayed with a captured image obtained by shooting moving images. The line 601 indicates the boundary between a first area 603 and a second area 604 set in advance on the captured image. The line 602 indicates the boundary between an inner area 604a and an outer area 604b set in advance in the second area 604. The inner area 604a is the area in the second area 604 closer to the center of the captured image. The outer area 604b is the area in the second area 604 farther from the center of the captured image, and is also the area in the second area 604 other than the inner area 604a.

The example illustrated in FIG. 21 may be realized when, for example, the acceleration in the direction of pan of the digital camera 100 (for example, refer to the direction of the arrow in FIG. 22) is detected by the acceleration sensor 138.

Figure 22:
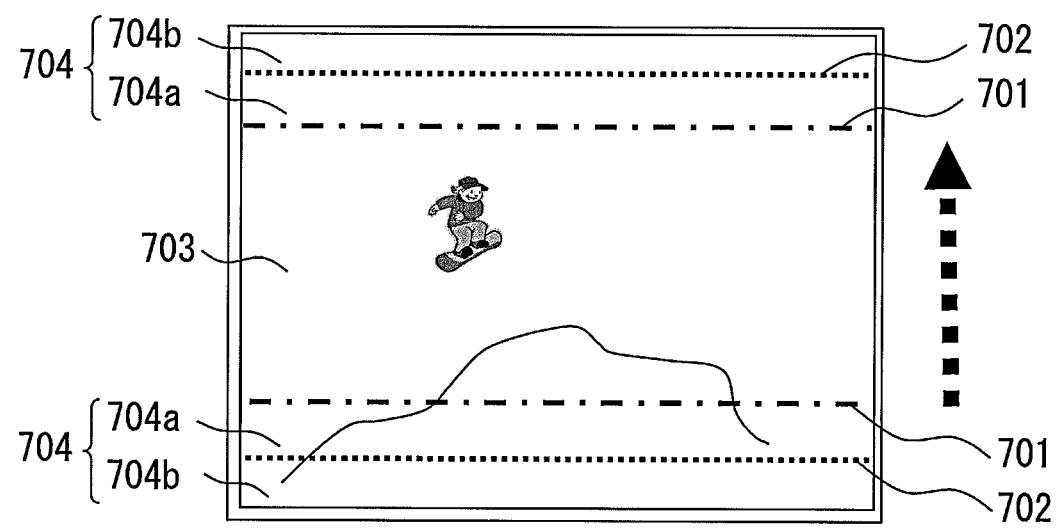
FIG. 22 is an explanatory view of an example of setting the second area (inner area, outer area) with respect to the first area above and below the captured image according to a variation example of the third embodiment.

FIG. 22 is an explanatory view of an example of setting the second area (inner area, outer area) with respect to the first area above and below the captured image. The example illustrated in FIG. 22 indicates the display of the back liquid crystal panel 118 when the backlight 133 is ignored, or the display of the EVF panel 126 when the built-in backlight is ignored.

As illustrated in FIG. 22, in the present embodiment, a line 701 by alternate long and short dashed line and a line 702 by dotted line are superposed and displayed with a captured image obtained by shooting moving images. The line 701 indicates the boundary between a first area 703 and a second area 704 set in advance on the captured image. The line 702 indicates the boundary between an inner area 704a and an outer area 704b set in advance in the second area 704. The inner area 704a is the area in the second area 704 closer to the center of the captured image. The outer area 704b is the area in the second area 704 farther from the center of the captured image, and is also the area in the second area 704 other than the inner area 704a.

The example illustrated in FIG. 22 may be realized when, for example, the acceleration in the direction of tilt of the digital camera 100 (for example, refer to the direction of the arrow in FIG. 22) is detected by the acceleration sensor 138.

The embodiments 1 through 3 are described above, but the following variations are also applicable in each embodiment.

For example, the warning sound by the speaker 112 may be generated when the main subject deviates from the captured image.

Furthermore, for example, if an external mike or an external speaker is connected when the back liquid crystal panel 118 or the EVF panel 126 is turned off or the brightness of any of them is reduced in the track recording process, the back liquid crystal panel 118 or the EVF panel 126 may be turned on.

Furthermore, for example, when the touching operation is performed on the touch panel 117 when the back liquid crystal panel 118 is turned off or the brightness of the panel is reduced in the track recording process, the back liquid crystal panel 118 may be turned on.

In addition, for example, the EVF panel 126 may be configured by an organic electro luminescence (EL) panel.

Furthermore, for example, an imaging device described in each embodiment may be configured as, in addition to a digital camera, a mobile telephone, a personal handy-phone system (PHS), a personal digital assistant (PDA), a smart-phone, etc. provided with a camera function.

Accordingly, the operation explained in each embodiment may be combined with other operations explained in other embodiments.

The embodiments of the present invention are described above, but the present invention is not limited to the embodiments above, and may be improved and varied within the scope of the gist of the present invention.

According to the disclosed device, method, and recording medium above, the low power consumption may be realized without affecting the convenience of a user in shooting moving images when the automatically tracking function is used.

What is claimed is:

1. An imaging device, comprising:
an imaging unit which captures a subject and acquires a captured image;
a display unit which displays the captured image acquired by the imaging unit;
an area setting unit which sets a first area and a second area other than the first area on the captured image acquired by the imaging unit;
a main subject setting unit which sets a main subject based on the captured image acquired by the imaging unit or another image;
an announcement unit which automatically announces whether or not the main subject exists only in the first area; and
an ASIC which (1) automatically and periodically detects a position of the main subject on the captured image acquired by the imaging unit, (2) performs control depending on a detected position of the main subject on the captured image so that the announcement unit turns off the display unit as an announcement that the main subject exists only in the first area when the main subject does not exist in the second area, and the announcement unit turns on the display unit as an announcement that the main subject does not exist only in the first area when the main subject exists in the second area, and (3) causes the imaging device to continuously record a sequence of captured images acquired by the imaging unit until receipt of a recording stop instruction when the main subject does not exist in the second area.

2. The device according to claim 1, wherein
the first area is an area including the center of the captured image acquired by the imaging unit.

3. The device according to claim 2, further comprising
an operation mode setting unit which sets at least a normal mode or a low power consumption mode as an operation mode, wherein
when the operation mode setting unit sets the low power consumption mode, the ASIC performs control depending on a detected position of the main subject on the captured image so that the announcement unit announces that the main subject exists only in the first area when the main subject does not exist in the second area, and the announcement unit announces that the main subject does not exist only in the first area when the main subject exists in the second area.

4. The device according to claim 3, further comprising
a temperature sensor which detects an ambience temperature of the imaging device, wherein
the operation mode setting unit sets the low power consumption mode as an operation mode when the ambience temperature detected by the temperature sensor is lower than a specified temperature.

5. The device according to claim 2, wherein
depending on a detected position of the main subject on the captured image, the ASIC detects the position of the main subject in a first period when the main subject does not exist in the second area, and detects the position of the main subject in a second period shorter than the first period when the main subject exist in the second area.

6. The device according to claim 2, further comprising
a speed detection unit which obtains an amount of position change per unit time of the main subject from information about a position of the main subject periodically detected by the ASIC, wherein
the ASIC detects a position of the main subject in a first period when the amount of position change detected by the speed detection unit is smaller than a specified amount, and detects the position of the main subject in a second period shorter than the first period when the amount of position change detected by the speed detection unit is not less than the specified amount.

7. The device according to claim 2, further comprising
a variable power unit which zooms on a zoom-up side or a wide angle side, wherein
the control unit directs the variable power unit to zoom on a wide angle side when a zoom state of the variable power unit is on a zoom-up side and the main subject exists in the second area; and
the variable power unit zooms according to the direction of the control unit.

8. The device according to claim 7, wherein
the variable power unit zooms by optical variable power.

9. The device according to claim 7, wherein
the variable power unit zooms by electronic variable power by a variation of a segmented area of the captured image acquired by the imaging unit.

10. An announcing method used by a computer, comprising:
setting a first area and a second area other than the first area in a captured image by shooting and acquiring a subject;

setting a main subject based on the captured image acquired by shooting a subject or another image;

periodically and automatically detecting a position of the main subject on the captured image acquired by shooting the subject;

based on a result of detecting the position of the main subject, turning off a display unit that displays the captured image as an announcement that the main subject exists only in the first area when the main subject does not exist in the second area of the captured image, and turning on a display unit as an announcement that the main subject does not exist only in the first area when the main subject exists in the second area of the captured image; and causing, when the main subject does not exist in the second area, the computer to continuously record a sequence of captured images acquired until receipt of a recording stop instruction.

11. A non-transitory computer-readable recording medium storing a program used to direct a computer to perform the processes comprising:

setting a first area and a second area other than the first area in a captured image by shooting and acquiring a subject;

setting a main subject based on the captured image acquired by shooting a subject or another image;

periodically and automatically detecting a position of the main subject on the captured image acquired by shooting the subject;

based on a result of detecting the position of the main subject, turning off a display unit that displays the captured image as an announcement that the main subject exists only in the first area when the main subject does not exist in the second area of the captured image, and turning on a display unit as an announcement that the main subject does not exist only in the first area when the main subject exists in the second area of the captured image; and causing, when the main subject does not exist in the second area, the computer to continuously record a sequence of captured images acquired until receipt of a recording stop instruction.

* * * * *